United States Patent
Tiwari et al.

(10) Patent No.: US 12,112,321 B2
(45) Date of Patent: Oct. 8, 2024

(54) SYSTEMS AND METHODS FOR IMPLEMENTING A SECURE USER INTERFACE

(71) Applicant: QUALCOMM Incorporated, San Diego, CA (US)

(72) Inventors: Prakash Tiwari, Hyderabad (IN); Shvetank Kumar Singh, Hyderabad (IN); Rajesh Yadav, Hyderabad (IN); Naga Chandan Babu Gudivada, Hyderabad (IN); Vidyasagar Gopireddy, Mahabubnagar (IN); Manish Sharma, Hyderabad (IN); Utkarsh Mehta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 16/699,071

(22) Filed: Nov. 28, 2019

(65) Prior Publication Data

US 2021/0166227 A1   Jun. 3, 2021

(51) Int. Cl.
| | |
|---|---|
| G06Q 20/32 | (2012.01) |
| G06F 9/451 | (2018.01) |
| G06F 16/23 | (2019.01) |
| G06F 21/53 | (2013.01) |
| G06F 21/57 | (2013.01) |
| G06Q 20/10 | (2012.01) |
| G06Q 20/36 | (2012.01) |
| G06Q 20/38 | (2012.01) |
| G06Q 20/40 | (2012.01) |
| G06Q 40/06 | (2012.01) |
| H04L 29/06 | (2006.01) |
| H04W 12/06 | (2021.01) |
| H04W 12/08 | (2021.01) |
| G06F 21/31 | (2013.01) |

(Continued)

(52) U.S. Cl.
CPC ......... G06Q 20/3823 (2013.01); G06F 9/451 (2018.02); G06F 21/53 (2013.01); G06F 21/57 (2013.01)

(58) Field of Classification Search
CPC ............ G06Q 20/3823; G06Q 20/382; G06Q 20/326; G06F 9/451; G06F 21/53; G06F 21/84; G06F 3/0488; G06F 3/04886; G06F 2203/04803; H04L 63/0853
See application file for complete search history.

(56) References Cited

U.S. PATENT DOCUMENTS 9,027,142 B1 *   5/2015   Call ..................... H04L 63/1416
                                                                  726/25
9,104,840 B1 *   8/2015   Paczkowski ............ G06F 21/00

(Continued)

FOREIGN PATENT DOCUMENTS

JP      2015130181 A  *  7/2015  ........... G06Q 20/204
WO      WO-2021077882 A1 *  4/2021

*Primary Examiner* — Daniel S Felten
*Assistant Examiner* — Douglas W Pinsky
(74) *Attorney, Agent, or Firm* — The Marbury Law Group

(57) ABSTRACT

Various embodiments include methods and devices for implementing a secure user interface. The method may include generating a secure user interface display in a secure execution environment, generating a non-secure display in a normal execution environment, combining the secure user interface and the non-secure display into a combined display, and presenting the combined display via a display device.

30 Claims, 13 Drawing Sheets

(51) Int. Cl.
  *G06F 21/32* (2013.01)
  *G06F 21/45* (2013.01)
  *G06Q 20/34* (2012.01)
  *G06Q 40/02* (2023.01)
  *H04W 4/14* (2009.01)
  *H04W 12/062* (2021.01)
  *H04W 12/72* (2021.01)
  *H04W 60/00* (2009.01)

(56) References Cited

U.S. PATENT DOCUMENTS

| | | | | |
|---|---|---|---|---|
| 2005/0275661 | A1* | 12/2005 | Cihula | G06F 21/55 345/619 |
| 2008/0022128 | A1* | 1/2008 | Proudler | G06F 21/84 713/189 |
| 2008/0209212 | A1* | 8/2008 | Ditzman | G06F 21/60 713/167 |
| 2011/0199308 | A1* | 8/2011 | Nativel | G06Q 20/18 345/168 |
| 2012/0299831 | A1* | 11/2012 | Lioy | G06F 21/36 345/168 |
| 2013/0167243 | A1* | 6/2013 | Corbett | G06F 21/53 726/26 |
| 2013/0305041 | A1* | 11/2013 | Bar-El | H04L 63/083 713/156 |
| 2014/0095387 | A1* | 4/2014 | Colnot | G06Q 20/3227 705/44 |
| 2014/0230067 | A1* | 8/2014 | Sahita | G06T 1/60 726/26 |
| 2015/0242636 | A1* | 8/2015 | Khan | H04L 63/1433 726/25 |
| 2016/0042201 | A1* | 2/2016 | Ninomiya | G06F 3/0416 345/87 |
| 2016/0092877 | A1* | 3/2016 | Chew | G06Q 20/4012 705/72 |
| 2017/0132414 | A1* | 5/2017 | Johansson | H04L 63/14 |
| 2017/0325088 | A1* | 11/2017 | Newham | H04W 12/33 |
| 2018/0121681 | A1* | 5/2018 | Huang | G06F 21/84 |
| 2018/0253548 | A1* | 9/2018 | Geraud | G06F 21/84 |
| 2019/0266345 | A1* | 8/2019 | Jeong | G06F 9/451 |
| 2020/0004762 | A1* | 1/2020 | Malhotra | G06F 16/254 |
| 2020/0065515 | A1* | 2/2020 | Wu | G06F 21/6245 |
| 2020/0081615 | A1* | 3/2020 | Lu | G06F 9/452 |
| 2020/0234275 | A1* | 7/2020 | Zhang | G06F 9/451 |
| 2021/0200886 | A1* | 7/2021 | Ramamurthy | G06F 21/629 |
| 2022/0245878 | A1* | 8/2022 | Zhang | G06F 9/451 |

* cited by examiner

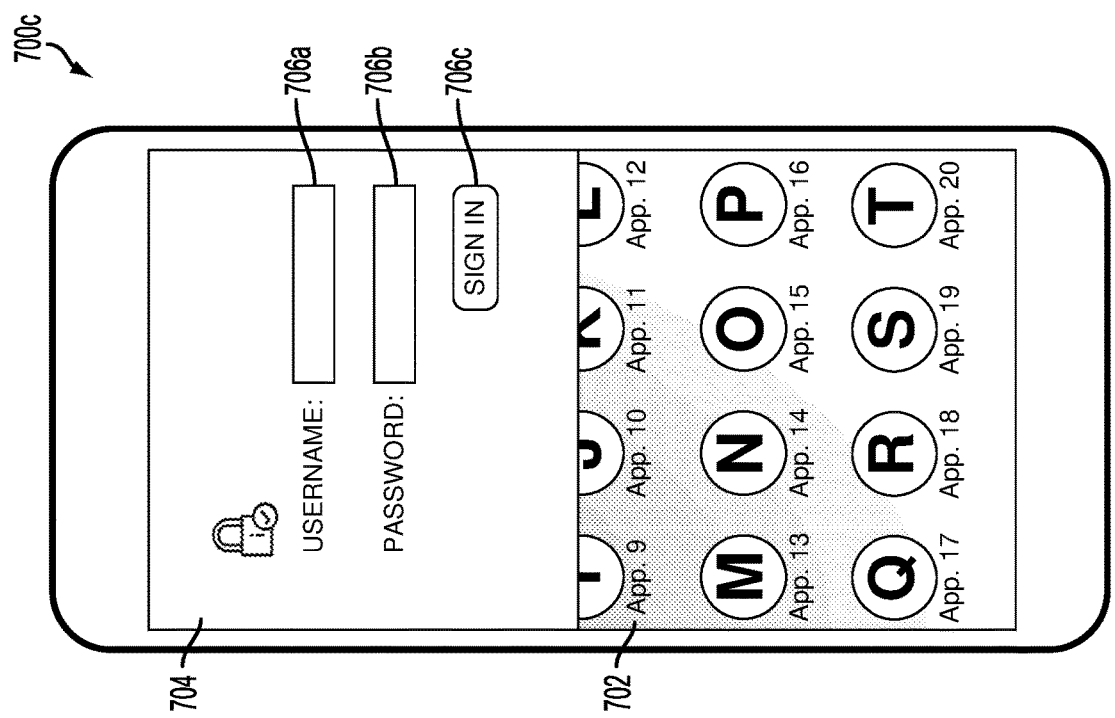

SYSTEMS AND METHODS FOR IMPLEMENTING A SECURE USER INTERFACE

BACKGROUND

The global digital payments ecosystem has witnessed massive amounts of innovation in the last decade, from physical currency, card, and check based systems to digital payment systems that complete transactions in a fraction of a second. Today, there are a number of digital payment servicers that allow for payment transactions to be made via a mobile computing device without the use of physical currency, credit, debit, or charge card, or check. Acceptance and use of these digital payment servicers continue to grow with increased acceptance of digital payments by commercial establishments and between peer users.

SUMMARY

Various aspects may include computing devices and methods for implementing a secure user interface on a computing device. Various aspects include generating a secure user interface display in a secure execution environment of a computing device, generating a non-secure display in a normal execution environment of the computing device, combining the secure user interface and the non-secure display into a combined display, and presenting the combined display via a display device.

Some aspects may further include assigning ownership of a first data input element to the secure execution environment, assigning ownership of a data input device to the secure execution environment, and assigning ownership of the display device to the secure execution environment. In such aspects, generating a secure user interface display in a secure execution environment may include generating a secure user interface having the first data input element owned by the secure execution environment. Some aspects may further include determining whether the first data input element is a vulnerable data input element, in which assigning ownership of a first data input element to the secure execution environment, assigning ownership of a data input device to the secure execution environment, and assigning ownership of the display device to the secure execution environment occur in response to determining that the first data input element is a vulnerable data input element. Some aspects may further include receiving, in the secure execution environment, a data input signal representing a user interaction with a second data input element via the data input device owned by the secure execution environment, determining whether the data input signal represents the user interaction with the first data input element owned by the secure execution environment, responding to the data input signal in response to determining that the data input signal represents the user interaction with the first data input element owned by the secure execution environment, and providing the data input signal to a client application running in the normal execution environment in response to determining that the data input signal does not represent the user interaction with the first data input element owned by the secure execution environment. In some aspects, generating a secure user interface display in a secure execution environment may include generating the secure user interface display having the first data input element owned by the secure execution environment, in which the first data input element is for a client application that is running in the normal execution environment and configured to implement a digital payment servicer function, and generating a non-secure display in a normal execution environment may include generating the non-secure display for the client application or an operating system.

Some aspects may further include determining whether a first data input element of a client application running in a normal execution environment is a vulnerable data input element, and preventing presentation of the vulnerable first data input element by the client application in response to determining that the first data input element is a vulnerable data input element.

In some aspects, presenting the combined display via a display device may include one of: presenting the secure user interface display and the non-secure display adjacent to each other; presenting the secure user interface display overlaid over the non-secure display; or presenting an integrated secure user interface and non-secure display.

Further aspects may include a computing device having a processor configured to perform one or more operations of any of the methods summarized above. Further aspects may include a non-transitory processor-readable storage medium having stored thereon processor-executable instructions configured to cause a processor of a computing device to perform operations of any of the methods summarized above. Further aspects include a computing device having means for performing functions of any of the methods summarized above.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

FIGS. 7A-7C are diagrams illustrating examples of a secure user interface implemented with an operating system screen for implementing various embodiments.

DETAILED DESCRIPTION

Figure 1:
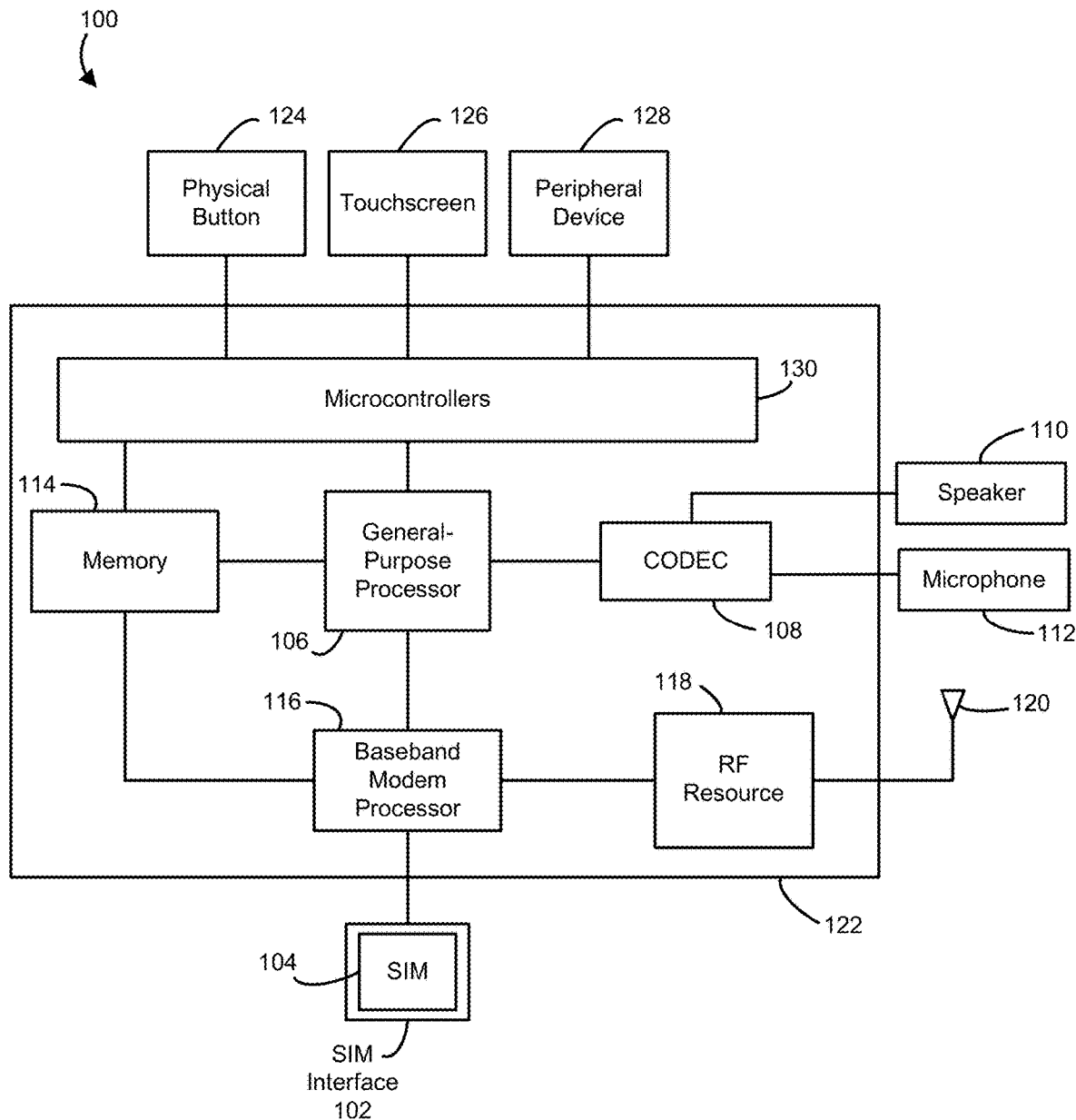
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices implementing such methods for generating a secure user interface (UI) to protect user-sensitive information that provides a better user experience that conventional UI methods. In some embodiments, a computing device may be configured to recognize when a vulnerable data input element is being used to access a digital payment servicer application and/or enact a digital payment via a digital payment servicer, and intervene to prevent the exposure of sensitive data to an operating system (OS) running in a normal execution environment on the computing device via the vulnerable data input element. In some embodiments, the computing device may be configured to implement control of a display and a data input device of the computing device via a secure execution environment to prevent the exposure of the sensitive data to the operating system. Some embodiments include a UI overlay that displays and/or receives sensitive information while leaving at least a portion of the display uncovered, thereby improving the user experience over secure data entry forms that involve implementing a different application and new display.

Various embodiments may be used in a variety of computing devices, but may be particularly useful in mobile devices, such as battery powered computing devices that may be used untethered to an electrical outlet and may communicate with other computing devices wirelessly. The term "computing device" is used herein to refer to any of a variety of computing devices including smartphones, mobile computing devices (e.g., tablets, laptops, wearable devices, etc.), Internet of Things ("IoT") devices, enhanced machine-type communication (eMTC) devices, desktops, workstations, serves, embedded systems of electromechanical systems (e.g., vehicles, residential and commercial appliances, industrial and agricultural machinery, medical devices, control systems, etc.), and the like. Wireless communication devices are also commonly referred to as user equipment (UE), mobile devices, and cellular devices. Computing devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System ("GPS")), personal area networks (e.g., Wireless USB, Bluetooth, ZigBee, etc.), near-field communication, etc.

Increasingly, people are choosing to make commercial and personal payment transactions digitally using digital payment servicers, such as mobile/digital/virtual wallet applications, bank applications, payment processing applications, etc running on a computing device. Adoption of digital payment transaction technologies and digital payment services depends in large measure on data security provided by such applications. Without data security, digital payment transactions run the risk of breaking the very foundation of trust on which the payment services exist. Securing key data elements, such a user name, account information, passwords, balances, and so forth that are stored, processed or transmitted in the entire digital payment transaction lifecycle is important as these data elements can be misused to commit fraud.

The increasing reliance on digital payment transactions exposes users of the digital payment servicers to vulnerabilities of the computing devices on which the digital payment servicers run. For example, use of a digital payment servicer may expose sensitive data provided to the digital payment servicer by the user to a compromised operating system running on the computing device. Digital payment servicers may run on a host operating system prone to hacking and the sensitive data. For example, trust credentials, such as account name and password, that are entered by a user and stored in non-secure, normal execution environment could be copied or sent to malicious actors if the operating system is compromised, such as through hacking, malware, etc. As another example, malicious actors can uses key loggers, trojans, and malware to sniff the user's data entries, and thus intercept the user's sensitive data.

In some embodiments, a trusted or secure user interface executed in a trusted or secure execution environment may be implemented to protect sensitive data provided by the user from exposure to the normal execution environment (e.g., operating system, unsecure memory, etc.). In implementing the secure user interface, the secure execution environment may take control or ownership of a display device (e.g., a touchscreen display) and data input devices (e.g., the touchscreen display and/or physical keys) of the computing device, isolating these display and input elements from the normal execution environment. The secure execution environment may control what is presented on the display device so that vulnerable data input elements that is not accessible to the normal execution environment and/or to prevent maliciously altered data input elements from being displayed to the user. The secure execution environment may further control what is presented on the display device so that secure data input elements may be presented on the display device. The secure execution environment may receive sensitive data input by the user via the data input devices, shielding the sensitive data from the normal execution environment.

In some embodiments, the secure execution environment may analyze a display generated by the normal execution environment to determine whether the display includes vulnerable data input elements. The secure execution environment may present portions of the display generated by the normal execution environment that do not include vulnerable data input elements by the display device. The secure execution environment may generate and present a display by the display device having secure data input elements. The display generated by the normal execution environment, whether or not modified by the secure execution environment, and the display generated by the secure execution environment may be combined and presented on the display device. In some embodiments, the combined display may be presented as a separate normal execution environment portion and a secure execution environment portion, such as adjacent to each other or one overlaid atop the other. In some embodiments, the combined display may be presented as an integrated normal execution environment and secure execution environment display.

FIG. 1 illustrates components of a computing device 100 that is suitable for implementing the various embodiments. The various embodiments described herein may be implemented in a computing device 100 that operates within a variety of communication systems, such as any number of mobile networks, such as mobile telephony networks. In various embodiments, a computing device 100 may support any number of subscriptions to mobile telephony networks. To support subscriptions to multiple mobile telephony networks, in some embodiments the computing device 100 may be a multi-SIM communication device.

A computing device 100 may communicate with a mobile telephony network via a cellular connection to a base station of the mobile telephony network. The cellular connection may be made through two-way wireless communication links using a variety of communication technologies, such as Long Term Evolution (LTE), fifth generation (5G), fourth generation (4G), third generation (3G), Code Division Multiple Access (CDMA), Time Division Synchronous Code Division Multiple Access (TD-SCDMA), Wideband Code Division Multiple Access (WCDMA), Global System for Mobile communication (GSM), and other mobile telephony communication technologies. Other connections may include various other wireless connections, including WLANs, such as Wi-Fi based on Institute of Electrical and Electronics Engineers (IEEE) 802.11 standards, and wireless location services, such as the Global Positioning System (GPS); WPANs, such as Wireless USB, Bluetooth, and ZigBee; and/or near-field communication.

A computing device 100 may include any number of subscriber identity modules (SIM) interfaces which may receive an identity module. The computing device 100 may include a subscriber identity module (SIM) interface 102, which may receive an identity module SIM 104 that is associated with a subscription to a mobile telephony network. In various embodiments, the computing device 100 may be a multi-subscription computing device including a second (or more) SIM interface (not shown), which may receive a second identity module SIM (not shown) that is associated with a second subscription to a second mobile telephony network.

A SIM 104 in the various embodiments may be a Universal Integrated Circuit Card (UICC) that is configured with SIM and/or Universal SIM (USIM) applications, enabling access to, for example, GSM, and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 104 may have a central processor unit (CPU), read only memory (ROM), random access memory (RAM), electrically erasable programmable read only memory (EE-PROM), and input/output (I/O) circuits. A SIM used in the various embodiments may contain user account information, an international mobile subscriber identity (IMSI), a set of SIM method application toolkit (SAT) commands, and storage space for phone book contacts. A SIM may further store a mobile country code (MCC), mobile network code (MNC), and a Home Public-Land-Mobile-Network (HPLMN) code to indicate the SIM card network operator provider. An Integrated Circuit Card Identity (ICCID) SIM serial number may be printed on the SIM for identification.

Each computing device 100 may include at least one controller, such as a general purpose processor 106 (e.g., a central processing unit (CPU)), which may be coupled to a coder/decoder (CODEC) 108. The CODEC 108 may be coupled to a speaker 110 and a microphone 112. The general purpose processor 106 may also be coupled to at least one memory 114. The memory 114 may be a non-transitory tangible computer readable storage medium that stores processor-executable instructions. For example, the instructions may include routing communication data relating to a subscription through a corresponding baseband-radio frequency (RF) resource chain, or RF chain. The memory 114 may store operating system (OS) software, as well as user application software and executable instructions, including instructions configured to cause a processor to perform operations of various embodiments.

The general purpose processor 106 and memory 114 may each be coupled to at least one baseband modem processor 116. In various embodiments the SIM 104 in the computing device 100 may be associated with a baseband-RF resource chain. In various embodiments, multiple SIMs 104 may be associated with a common baseband-RF resource chain shared by two or more SIMs 104, or a SIM 104 may be associated with a dedicated baseband-RF resource chain. Each baseband-RF resource chain may include the baseband modem processor 116 to perform baseband/modem functions for communications on a SIM 104, and one or more amplifiers and radios, referred to generally herein as RF resource 118. In some embodiments, baseband-RF resource chains may interact with a shared baseband modem processor 116 (i.e., a single device that performs baseband/modem functions for all SIMs 104 on the computing device). Alternatively, each baseband-RF resource chain may include physically or logically separate baseband processors.

In some embodiments, the baseband modem processor 116 may be an integrated chip capable of managing the protocol stacks of the SIMs 104 or subscriptions and implementing a co-existence manager software. By implementing modem software, subscription protocol stacks, and the co-existence manager software on this integrated baseband modem processor 116, thread based instructions may be used on the integrated baseband modem processor 116 to communicate instructions between the software implementing interference mitigation techniques for co-existence issues, and the receive (Rx) and transmit (Tx) operations.

The RF resource 118 may be communication circuits or transceivers that perform transmit/receive functions for the associated SIM 104 of the computing device 100. The RF resource 118 may be communication circuits that include separate transmit and receive circuitry, or may include a transceiver that combines transmitter and receiver functions. The RF resource 118 may be configured to support multiple radio access technologies/wireless networks that operate according to different wireless communication protocols. The RF resource 118 may include or provide connections to different sets of amplifiers, digital to analog converters, analog to digital converters, filters, voltage controlled oscillators, etc. Multiple antennas 120 and/or receive blocks may be coupled to the RF resource 118 to facilitate multimode communication with various combinations of antenna and receiver/transmitter frequencies and protocols (e.g., LTE, Wi-Fi, Bluetooth, near-field communication, and/or the like). The RF resources 118 may also be coupled to the baseband modem processor 116.

In some embodiments, the general purpose processor 106, memory 114, baseband processor(s) 116, and RF resource 118 may be included in the computing device 100 as a system-on-chip (SoC) 122. In other embodiments, the SIM 104 and its corresponding interfaces 102 may be external to the system-on-chip 122. Further, various peripheral devices, that may function as input and output devices, may be coupled to components on the system-on-chip 122, such as interfaces or controllers/microcontrollers 106, 108, 116, 118, 130. Example user peripheral device suitable for use in the computing device 100 may include, but are not limited to, the speaker 110, the microphone 112, the antenna 120, a physical button 124, a touchscreen 126, and other peripheral devices 128, such as a camera, an accelerometer, a gyroscope, a biometric sensor, a Universal Serial Bus (USB)port, etc. In some embodiments the touchscreen 126, may include a capacitive touch-panel, a display unit, such as a liquid crystal display (LCD), a light emitting diode (LED) display, an organic light emitting diode (OLED) display, etc., and an insulating layer, such as a glass or plastic layer.

In some embodiments, the computing device 100 may be a single-technology or multiple-technology device having more or less than two RF chains. Further, various embodiments may be implemented in single RF chain or multiple RF chain computing devices with fewer SIM cards than the number of RF chains, including devices that do not use any physical SIM cards relying instead on virtual SIM applications. In various embodiments, the computing device 100 having a common baseband-RF resource chain may be capable of operating in a single radio LTE mode to allow multiple radio access technologies to share the common baseband-RF resource chain.

Figure 2:
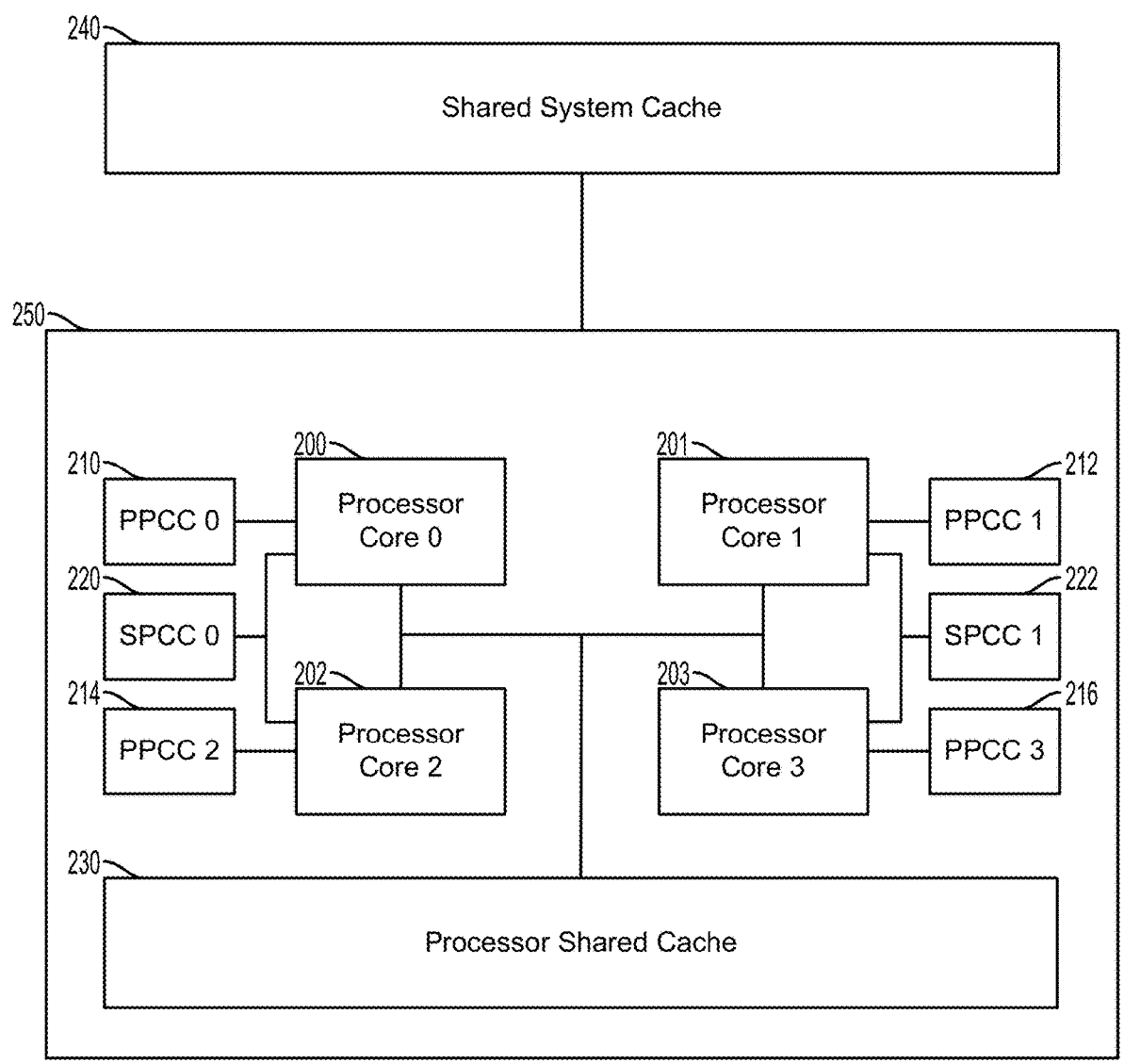
FIG. 2 is a component block diagram illustrating an example multicore processor suitable for implementing various embodiments.

FIG. 2 illustrates components of a computing device (e.g., computing device 100 in FIG. 1) suitable for implementing an embodiment. With reference to FIG. 1, a processor 250 (e.g., general purpose processor 106, baseband modem processor 116, controllers/microcontrollers 108, 118, 130) may include multiple processor types, including, for example, a CPU and various hardware accelerators, such as a graphics processing unit (GPU), a digital signal processor (DSP), an application processing unit (APU), a peripheral device processor, controllers/microcontrollers, etc. The processor 250 may also include a custom hardware accelerator, which may include custom processing hardware and/or general purpose hardware configured to implement a specialized set of functions. The processors 250 may include any number of processor cores 200, 201, 202, 203. A processor 250 having multiple processor cores 200, 201, 202, 203 may be referred to as a multicore processor.

The processor 250 may have a plurality of homogeneous or heterogeneous processor cores 200, 201, 202, 203. A homogeneous processor may include a plurality of homogeneous processor cores. The processor cores 200, 201, 202, 203 may be homogeneous in that, the processor cores 200, 201, 202, 203 of the processor 250 may be configured for the same purpose and have the same or similar performance characteristics. For example, the processor 250 may be a general purpose processor, and the processor cores 200, 201, 202, 203 may be homogeneous general purpose processor cores. The processor 250 may be a GPU or a DSP, and the processor cores 200, 201, 202, 203 may be homogeneous graphics processor cores or digital signal processor cores, respectively. The processor 250 may be a custom hardware accelerator with homogeneous processor cores 200, 201, 202, 203.

A heterogeneous processor may include a plurality of heterogeneous processor cores. The processor cores 200, 201, 202, 203 may be heterogeneous in that the processor cores 200, 201, 202, 203 of the processor 250 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 122 of FIG. 1) may include any number of homogeneous or heterogeneous processors 250. In various embodiments, not all off the processor cores 200, 201, 202, 203 need to be heterogeneous processor cores, as a heterogeneous processor may include any combination of processor cores 200, 201, 202, 203 including at least one heterogeneous processor core.

Each of the processor cores 200, 201, 202, 203 of a processor 250 may be designated a private processor core cache (PPCC) memory 210, 212, 214, 216 that may be dedicated for read and/or write access by a designated processor core 200, 201, 202, 203. The private processor core cache 210, 212, 214, 216 may store data and/or instructions, and make the stored data and/or instructions available to the processor cores 200, 201, 202, 203, to which the private processor core cache 210, 212, 214, 216 is dedicated, for use in execution by the processor cores 200, 201, 202, 203. The private processor core cache 210, 212, 214, 216 may include volatile memory.

Groups of the processor cores 200, 201, 202, 203 of a processor 250 may be designated a shared processor core cache (SPCC) memory 220, 222 that may be dedicated for read and/or write access by a designated group of processor core 200, 201, 202, 203. The shared processor core cache 220, 222 may store data and/or instructions, and make the stored data and/or instructions available to the group processor cores 200, 201, 202, 203 to which the shared processor core cache 220, 222 is dedicated, for use in execution by the processor cores 200, 201, 202, 203 in the designated group. The shared processor core cache 220, 222 may include volatile memory.

The processor 250 may include a shared processor cache memory 230 that may be dedicated for read and/or write access by the processor cores 200, 201, 202, 203 of the processor 250. The shared processor cache 230 may store data and/or instructions, and make the stored data and/or instructions available to the processor cores 200, 201, 202, 203, for use in execution by the processor cores 200, 201, 202, 203. The shared processor cache 230 may also function as a buffer for data and/or instructions input to and/or output from the processor 250. The shared cache 230 may include volatile memory.

Multiple processors 250 may access a shared system cache memory 240 (e.g., memory 114 in FIG. 1) that may be dedicated for read and/or write access by the processor cores 200, 201, 202, 203 of the multiple processors 250. The shared system cache 240 may store data and/or instructions and make the stored data and/or instructions available to the processor cores 200, 201, 202, 203, for use in execution by the processor cores 200, 201, 202, 203. The shared system cache 240 may also function as a buffer for data and/or instructions input to and/or output from the multiple processors 250. The shared system cache 240 may include volatile memory.

In the example illustrated in FIG. 2, the processor 250 includes four processor cores 200, 201, 202, 203 (i.e., processor core 0, processor core 1, processor core 2, and processor core 3). In the example, each processor core 200, 201, 202, 203 is designated a respective private processor core cache 210, 212, 214, 216 (i.e., processor core 0 and private processor core cache 0, processor core 1 and private processor core cache 1, processor core 2 and private processor core cache 2, and processor core 3 and private processor core cache 3). The processor cores 200, 201, 202, 203 may be grouped, and each group may be designated a shared processor core cache 220, 222 (i.e., a group of processor core 0 and processor core 2 and shared processor core cache 0, and a group of processor core 1 and processor core 3 and shared processor core cache 1). For ease of explanation, the examples herein may refer to the four processor cores 200, 201, 202, 203, the four private processor core caches 210, 212, 214, 216, two groups of processor cores 200, 201, 202, 203, and the shared processor core cache 220, 222 illustrated in FIG. 2. However, the four processor cores 200, 201, 202, 203, the four private processor core caches 210, 212, 214, 216, two groups of processor cores 200, 201, 202, 203, and the shared processor core cache 220, 222 illustrated in FIG. 2 and described herein are merely provided as an example and in no way are meant to limit the various embodiments to a four-core processor system with four designated private processor core caches and two designated shared processor core caches 220, 222. The computing device 100, the SoC 122, or the processor 250 may individually or in combination include fewer or more than the four processor cores 200, 201, 202, 203 and private processor core caches 210, 212, 214, 216, and two shared processor core caches 220, 222 illustrated and described herein.

For ease of reference, the terms "hardware accelerator," "custom hardware accelerator," "multicore processor," "processor," "processor core," "controller," and "microcontroller" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers and may be located and connected differently within the SoC or separate from the SoC.

Various embodiments are described with reference to FIGS. 3-10 refer to example hardware components described with reference to FIGS. 1 and 2. The following references to combinations of hardware components are not intended to be limiting regarding the number or types of processors, hardware accelerators, controllers, and/or memories that may be included as hardware components for implementing the various embodiments described herein. Various embodiments may be implemented using any combination of components.

Figure 3:
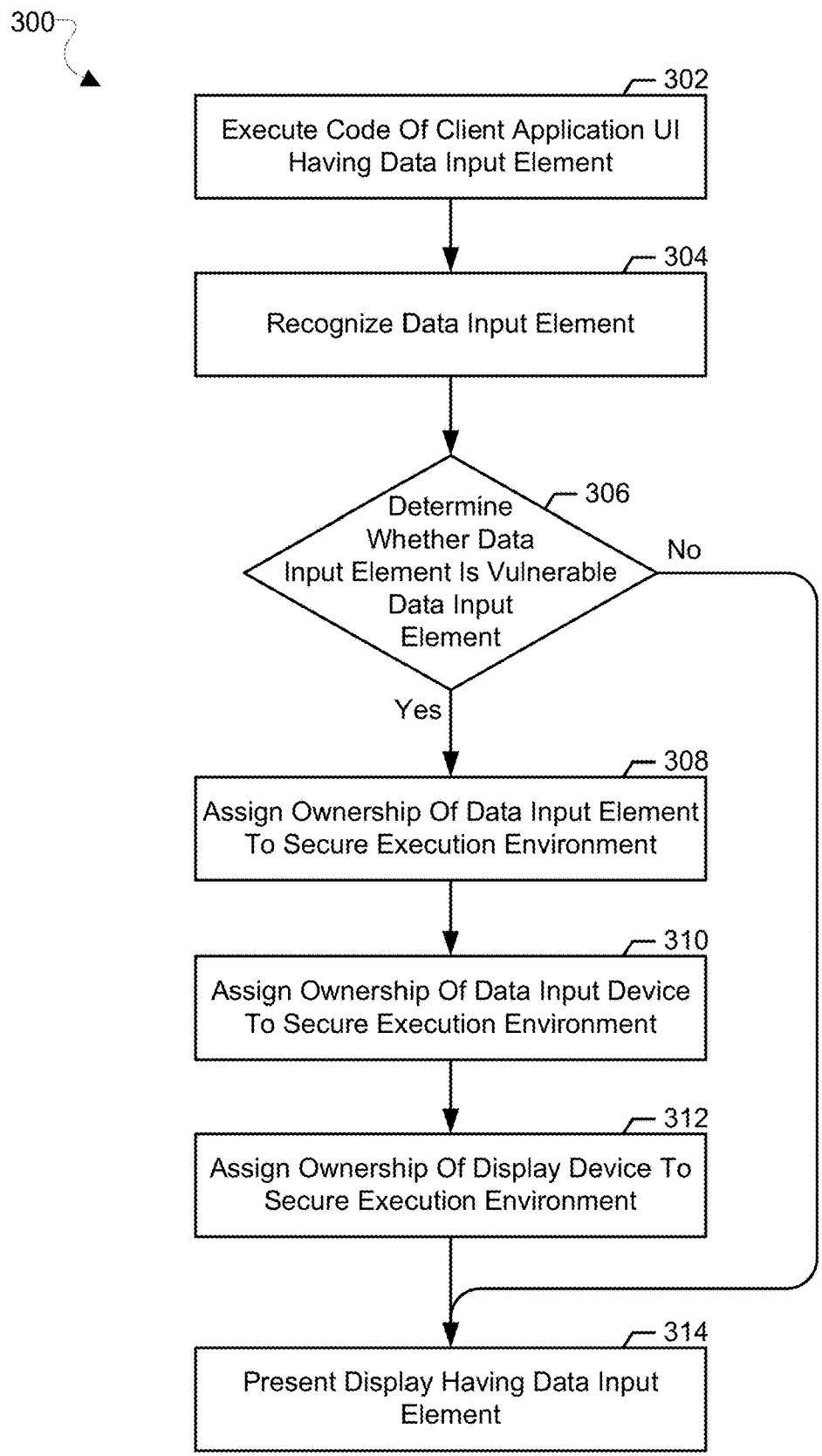
FIG. 3 is a process flow diagram illustrating a method for implementing a secure user interface (UI) according to various embodiments.

FIG. 3 illustrates a method 300 for implementing a secure user interface according to various embodiments. The method 300 may be implemented in a computing device, in software executing in a processor (e.g., general purpose processor 106, baseband modem processor 116, controllers/microcontrollers 108, 118, 130, processor cores 200, 201, 202, 203, and processor 250 in FIGS. 1 and 2), in general purpose hardware, in dedicated hardware, or in a combination of a software-configured processor and dedicated hardware, such as a processor executing software within a secure user interface system (e.g., configuration of a computing device 100 in FIG. 1) that includes other individual components (e.g., memory 114, private processor core caches 210, 212, 214, 216, shared processor core caches 220, 222, and shared system cache 240 in FIG. 2), and various memory/cache controllers. In order to encompass the alternative configurations enabled in various embodiments, the hardware implementing the method 300 is referred to herein as a "processing device."

A client application may be any application, such as a digital payment servicer application, a web browser, or a commercial application, that incorporates digital payment servicer functions. Such digital payment servicer functions may include logging in to a digital payment servicer account, requesting and/or confirming enactment of a digital payment via a digital payment servicer account, updating information for a digital payment servicer account, etc. A user interface may include functionality for a user of the computing device to provide data to the client application. The user interface may include any combination of visual, audible, or tactile user interfaces. A data input element of the user interface may be configured for provision of the data to the user interface. The data input element may be any element of the user interface that allows a user to select a data option or provide fully and/or restricted freeform data. For example, a data input element may include, a radio button, a dropdown menu, a checkbox, a slider, a data entry field, an oral data recorder, a tactile data recorder, etc. As described further herein, typically, the user may interact with a variety of data input devices of the computing device to provide the computing device with the data via the data input element of the user interface. Typically, the user interface may provide the data received via the data input element to the client application. In some instances, the data may include sensitive data, such as a username, a password, a security question answer, a personal identifier number (PIN), a digital payment servicer account identifier, a commercial application account identifier, a bank account number, a credit/debit card number, personal user identifying information, etc. The method 300 described herein includes various means for enabling the user to provide the computing device with the data. The method 300 described herein includes various means for enabling the computing device to intervene in the typical execution of the application to prevent the exposure of sensitive data to an operating system running in a normal execution environment on the computing device via a vulnerable data input element, including, for example, at least some embodiments as described for blocks 304-314.

In block 302, the processing device may execute code of a client application user interface having a data input element. In block 304, the processing device may recognize the data input element of the user interface. In preparing the user interface for presentation to the user, the processing device may analyze the code of the client application for data input elements in the code for the user interface. In some embodiments, the code for the user interface of the client application may be generated using an application programming interface (API) configured with functions for signifying data input elements to the processing device. In some embodiments, the processing device may recognize data input element types in the code for the user interface. The processing device may further recognize code segments configured to record signals from data input devices of the computing device. A data input device may include, a speaker (e.g., speaker 110 in FIG. 1), a microphone (e.g., microphone 112 in FIG. 1), an antenna (e.g., antenna 120 in FIG. 1), a physical button (e.g., physical button 124 in FIG. 1), a touchscreen (e.g., touchscreen 126 in FIG. 1), or other peripheral devices, such as a camera, an accelerometer, a gyroscope, a biometric sensor, a USB port, etc. (e.g., peripheral devices 128 in FIG. 1).

In determination block 306, the processing device may determine whether the data input element is a vulnerable data input element. Data input elements that allow for fully and/or restricted freeform data entry are potentially vulnerable to hacking. Fully and/or restricted freeform data entry may include data provided by a user in the form of alphabetical, numerical, and/or symbolic characters, sound waves, and/or light waves. Fully freeform data entry may not restrict the data of a specific form. Restricted freeform data entry may restrict the data of a specific form to exclude and/or include certain characters and/or frequencies. A nonfreeform data entry may include data provided by a user through a selection of data presented to the user via the user interface. In some embodiments, the code for the user interface of the client application may be generated using the application programming interface configured with functions for signifying a vulnerable data input element to the processing device. In some embodiments, the processing device may determine that a data input element type and/or a code segment configured to record signals from a data input is a vulnerable data input element based on whether the data input element type and/or a code segment allow for fully and/or restricted freeform data entry.

In response to the processing device determining that the data input element is a vulnerable data input element (i.e., determination block 306="Yes"), the processing device may assign ownership of the data input element to a secure execution environment in block 308. The computing device may run multiple execution environments, including a non-secure, normal execution environment and a trusted or secure execution environment. The operating system of the computing device may run in the normal execution environment and vulnerable to malicious attacks. The secure execution environment may run secure software isolated from the operating system. The processing device may assign ownership of a data input element so that presentation of the data input element to the user is executed and data provided by the user via the data input element is received by the secure execution environment rather than the normal execution environment. A data input element owned by the secure execution environment may be referred to as a secure data input element.

In block 310, the processing device may assign ownership of a data input device to the secure execution environment. Assigning ownership of a data input device to the secure execution environment may configure the processing device to route input signals from the owned data input device to the secure execution environment, bypassing the operating system and normal execution environment. To ensure that the data provided by the user via the secure data input element is received by the secure execution environment, the processing device may assign ownership of any data input device that may be used by the user to provide data. In some embodiments, the processing device may assign ownership of a single data input device, such as a touchscreen, a microphone, a camera, etc., to the secure execution environment based on a data input device being associated with a particular data input element. For example, a text field data input element may be associated with a touchscreen implemented keyboard, a sound wave recording data input element may be associated with a microphone, and light wave recording data input element may be associated with a camera. In some embodiments, the processing device may assign ownership of multiple data input devices, such as a touchscreen, a microphone, a camera, etc., to the secure execution environment based on any combination of the data input devices being associated with a particular data input element, no association of data input devices with a particular data input element, and/or by default. For example, a text field data input element may be associated with a touchscreen implemented keyboard, a microphone, and/or a camera, and/or may have no specific association with a data input device.

In block 312, the processing device may assign ownership of a display device of the computing device to the secure execution environment. The processing device may be configured to present multiple displays to the user via the display device. The multiple displays may include a portion of the display generated by the normal execution environment and a portion of the display generated by the secure execution environment. Assigning ownership of the display device to the secure execution environment may configure the processing device to present the multiple displays authorized by the secure execution environment. For example, the processing device may present a portion of the display generated by the normal execution environment that do not include vulnerable data input elements via the display device and a portion of the display generated by the secure execution environment having secure data input elements. The display generated by the normal execution environment, whether or not modified by the secure execution environment, and the display generated by the secure execution environment may be combined and presented by the display device by the processing device. In some embodiments, the combined display may be presented as separate normal execution environment and secure execution environment portions, such as adjacent to each other or one overlaid over the other. In some embodiments, the combined display may be presented as an integrated normal execution environment and secure execution environment display. Examples of the combined displays are described further herein with reference to FIGS. 7A-9D.

Following assigning ownership of the display device to the secure execution environment in block 312, or in response to the processing device determining that the data input element is not a vulnerable data input element (i.e., determination block 306="No"), the processing device may present a display having a data input element in block 314. In some embodiments, such as following assigning ownership of the display device to the secure execution environment in block 312, the display may be a combined display and the data input element may be the secure data input element. The processing device may present the combined display to the user of the computing device via the display device assigned to the secure execution environment. In some embodiments, such as in response to the processing device determining that the data input element is not a vulnerable data input element (i.e., determination block 306="No"), the data input element may be any non-vulnerable data input element. The processing device may present the display to the user of the computing device via the display device through the normal execution environment.

Figure 4:
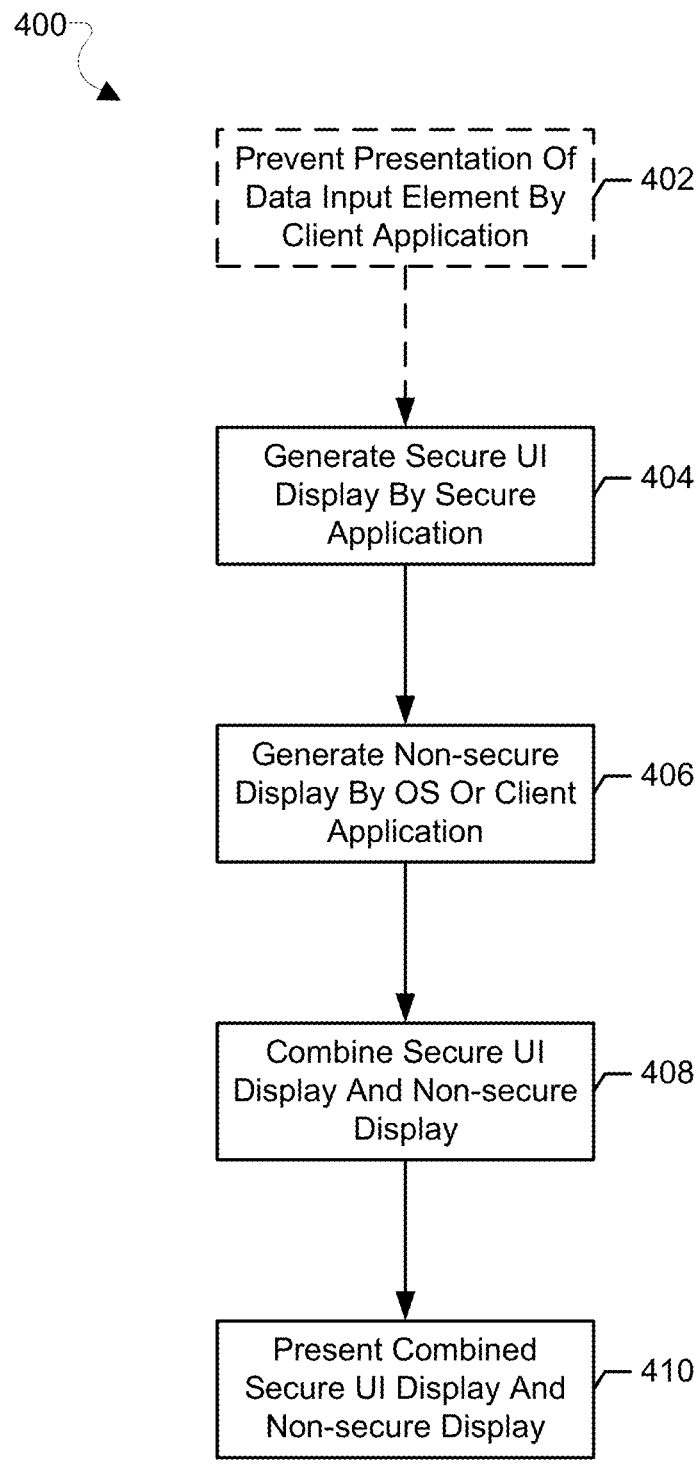
FIG. 4 is a process flow diagram illustrating a method for presenting a secure user interface according to various embodiments.

FIG. 4 illustrates a method 400 for presenting a secure user interface according to some embodiments. The method 400 may be implemented in a computing device, in software executing in a processor (e.g., general purpose processor 106, baseband modem processor 116, controllers/microcontrollers 108, 118, 130, processor cores 200, 201, 202, 203, and processor 250 in FIGS. 1 and 2), in general purpose hardware, in dedicated hardware, or in a combination of a software-configured processor and dedicated hardware, such as a processor executing software within a secure user interface system (e.g., configuration of a computing device 100 in FIG. 1) that includes other individual components (e.g., memory 114, private processor core caches 210, 212, 214, 216, shared processor core caches 220, 222, and shared system cache 240 in FIG. 2), and various memory/cache controllers. In order to encompass the alternative configurations enabled in various embodiments, the hardware implementing the method 400 is referred to herein as a "processing device." In some embodiments, the method 400 may further describe presenting the combined display having a data input element in block 314 following assigning ownership of the display device to the secure execution environment in block 312 of the method 300 as described with reference to FIG. 3.

In optional block 402, the processing device may prevent presentation of the vulnerable data input element by the client application. As discussed with reference to FIG. 3 regarding determination block 306 and blocks 308 and 312 of the method 300, the processing device may identify a vulnerable data input element and assign the data input element and the data input element's presentation to the display device to the secure execution environment to protect data provided by a user via the data input element. To prevent the potential compromise of the user's data, the processing device may remove or skip executing code for the vulnerable data input element in the user interface of the client application, individually or collectively also referred to as preventing execution of the code. In some embodiments, the code for the user interface of the client application may be generated using the application programming interface configured with functions for presentation of only secure data input elements or non-vulnerable data input elements by the processing device. For code generated using this application programming interface, it may not be necessary for the processing device to prevent presentation of the vulnerable data input element by the client application in optional block 402.

In block 404, the processing device may generate a secure user interface display by a secure application. The processing device may execute a secure application in the secure execution environment. The processing device may be configured by the secure application to generate a secure user interface having a secure data input element. The secure data input element may be the same as the vulnerable data input element, except that the secure data input element is generated and owned by the secure execution environment rather than the normal execution environment.

In block 406, the processing device may generate a non-secure display by the operating system or a client application. The processing device may execute the operating system or a client application in the normal execution environment. The processing device may be configured by the operating system or a client application to generate the non-secure display. In some embodiments, while the processing device presents the secure user interface, the processing device may delay presentation of the user interface of the client application, and the non-secure display may include a non-secure display of the operating system or another client application. In some embodiments, the non-secure display may include the user interface of the client application excluding a vulnerable data input element.

In block 408, the processing device may combine the secure user interface display and the non-secure display. In some embodiments, the secure user interface display and the non-secure display may be combined as separate secure user interface display and non-secure display portions, such as adjacent to each other or one overlaid over the other. In some embodiments, the secure user interface display and the non-secure display may be combined as an integrated secure user interface and non-secure display. Examples of the combined displays are described further herein with reference to FIGS. 7A-9D.

In block 410, the processing device may present the combined display of the secure user interface display and the non-secure display. The processing device may present the combined display via a display device. For example, the processing device may present the combined display graphically on a touchscreen. The processing device may output the combined display audibly via a speaker.

Figure 5:
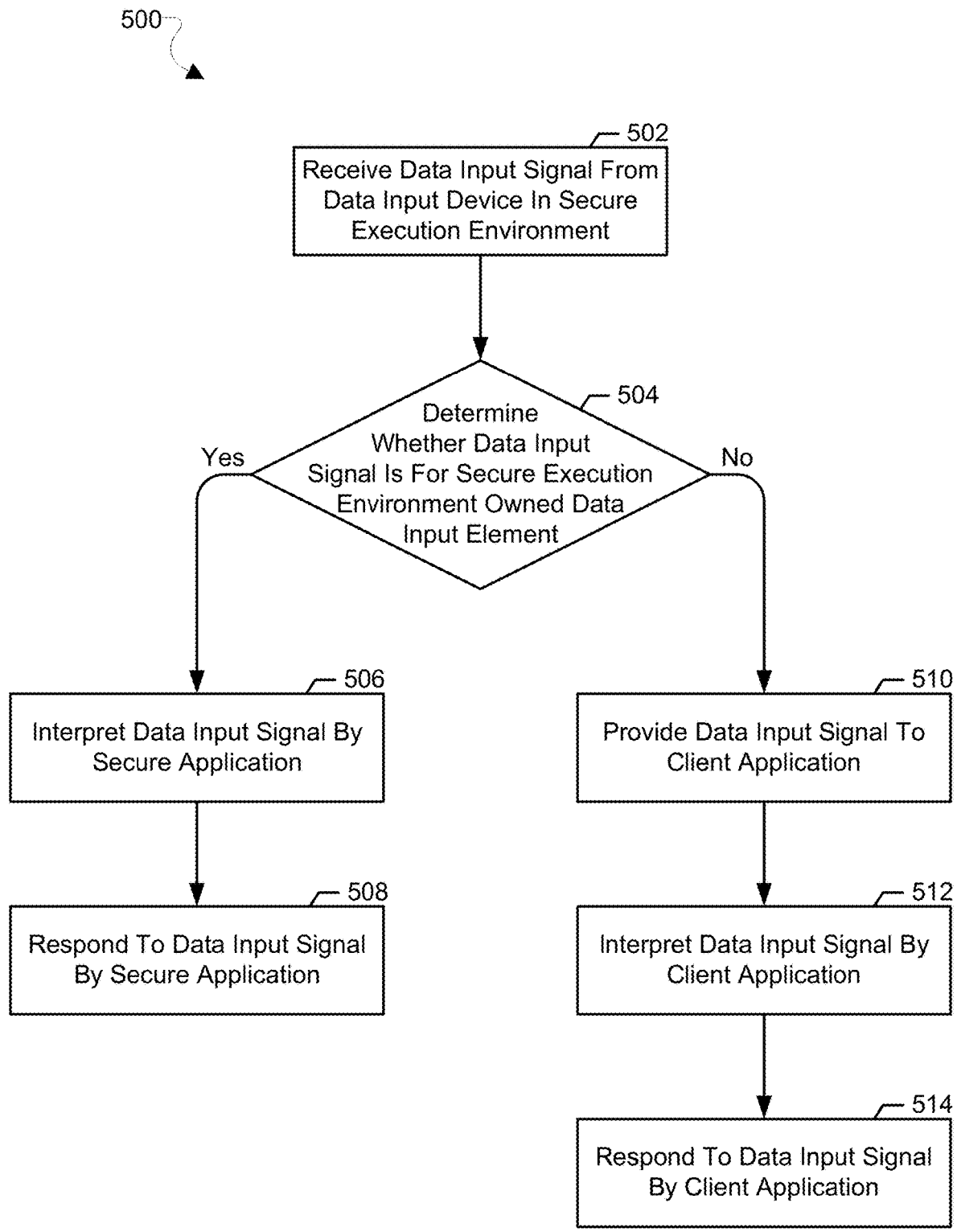
FIG. 5 is a process flow diagram illustrating a method for responding to user interaction with a secure user interface according to various embodiments.

FIG. 5 illustrates a method 500 for responding to a user interaction with a secure user interface according to various embodiments. The method 500 may be implemented in a computing device, in software executing in a processor (e.g., general purpose processor 106, baseband modem processor 116, controllers/microcontrollers 108, 118, 130, processor cores 200, 201, 202, 203, and processor 250 in FIGS. 1 and 2), in general purpose hardware, in dedicated hardware, or in a combination of a software-configured processor and dedicated hardware, such as a processor executing software within a secure user interface system (e.g., configuration of a computing device 100 in FIG. 1) that includes other individual components (e.g., memory 114, private processor core caches 210, 212, 214, 216, shared processor core caches 220, 222, and shared system cache 240 in FIG. 2), and various memory/cache controllers. In order to encompass the alternative configurations enabled in various embodiments, the hardware implementing the method 500 is referred to herein as a "processing device."

In block 502, the processing device may receive a data input signal from a data input device in the secure execution environment. The data input device may be owned by the secure execution environment, as described for block 310 of the method 300 with reference to FIG. 3. Any data input signal resulting from a user interaction with the data input device owned by the secure execution environment may be received in the secure execution environment. Any combination of data input devices may be owned by the secure execution environment regardless of whether user interaction with a data input device may provide data to a secure data input element.

In determination block 504, the processing device may determine whether a data input signal is from a secure data input element owned by the secure execution environment. The secure data input element may be owned by the secure execution environment as described for block 308 of the method 300 with reference to FIG. 3. Ownership of a secure data input element may be recorded on the computing device, for example, in a data structure, in a register, in a state machine, etc. The recorded ownership may identify a secure data input element and/or ownership status of the secure data input element. The processing device may determine whether a data input element is a secure data input element and the secure data input element's ownership by checking for a record of ownership of the data input element by the secure execution environment. The processing device may further determine which data input device a data input signal is from by an indicator configured to identify the data input device that may be part of the data input signal, and/or a path on the computing device on which the processing device receives the data input signal based on the data input device being associated with the path.

In response to determining that the data input signal is from a secure data input element owned by the secure execution environment (i.e. determination block 504="Yes"), the processing device may interpret the data input signal in block 506. The processing device may interpret the data input signal to identify the data provided by the user to the secure data input element. The processing device may interpret the type of data, such as a character entered into a text data field, a light wave captured by a camera, a sound wave captured by a microphone, etc. The processing device may interpret the meaning of the data or what the data represents, which may include sensitive data such as a username, a password, a security question answer, a PIN number, a digital payment servicer account identifier, a commercial application account identifier, a bank account number, a credit/debit card number, personal user identifying information, etc. A secure application running in the secure execution environment by the processing device may configure the processing device to interpret the data input signal.

In block 508, the processing device may respond to the data input signal. The processing device may be configured by the security application to respond to the data input signal depending on the purpose for asking for the data provided by the user. The processing device may be configured to respond to the data input signal by implementing a digital payment servicer function, which may include logging in to a digital payment servicer account, requesting and/or confirming enactment of a digital payment via a digital payment servicer account, updating information for a digital payment servicer account, etc.

In response to determining that the data input signal is not from a secure data input element owned by the secure execution environment (i.e. determination block 504="No"), the processing device may provide the data input signal to the client application in block 510. The client application may be run by the processing device in the normal execution environment. Having received the data input signal in the secure execution environment, the processing device may transmit the data input signal from the secure execution environment to the normal execution environment. The processing device may be configured by the client application to process the data input signal received in the normal execution environment.

In block 512, the processing device may interpret the data input signal. The processing device may interpret the data input signal to identify the data provided by the user to the secure data input element. The processing device may interpret the type of data, such as data resulting from an user interaction with a data input device other than a user interaction with a data input device to provide data to a secure data input element. For example, a user interaction with the touchscreen of the computing device to scroll a display and/or to select an item in the display other than a secure data input element. Any user interaction with a data input device that does not provide data to a secure data input element may result in a data input signal that may be interpreted by the processing device in the normal execution environment. The processing device may interpret the meaning of the data or what the data represents. The data input signal interpreted by the processing device in the normal execution environment may represent data other than the sensitive data that may be interpreted by the processing device in the secure execution environment. In some embodiments, the client application running in the normal execution environment by the processing device may configure the processing device to interpret the data input signal.

Figure 6:
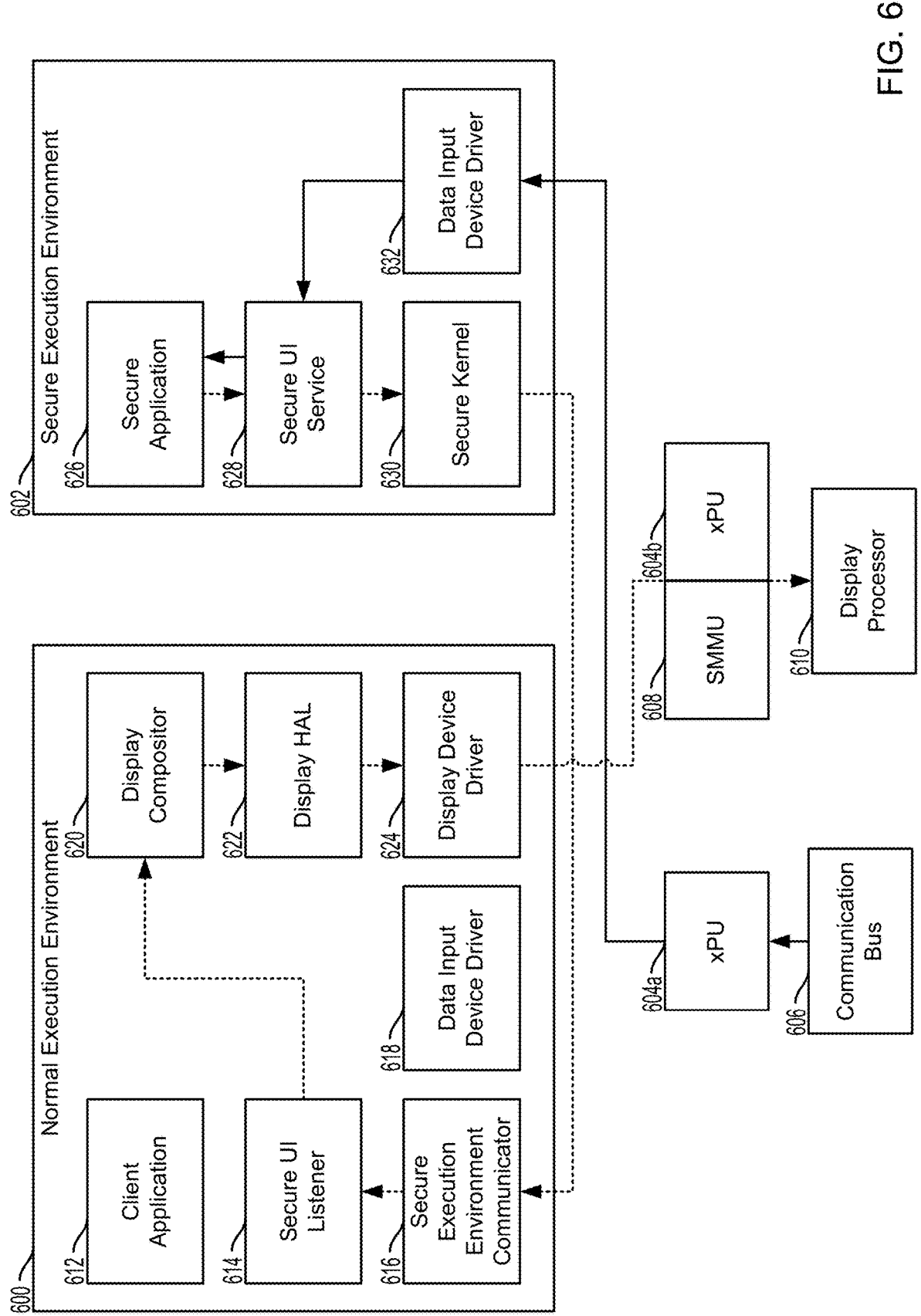
FIG. 6 is a component block and signaling flow diagram illustrating an example of secure user interface user interaction response and secure user interface presentation for implementing various embodiments.

In block 514, the processing device may respond to the data input signal. The processing device may be configured by the client application to respond to the data input signal depending on the data provided by the user. The processing device may be configured to respond to the data input signal by implementing a function of the operating system, commercial application, web browser, or digital payment servicer application that does not include a digital payment servicer function, FIG. 6 illustrates an example of components and software-implemented function modules of a computing device and signaling between the components for secure user interface user interaction response and secure user interface presentation. The components and software-implemented function modules of the computing device (e.g., computing device 100 in FIG. 1) may include a normal execution environment 600 and a secure execution environment 602 of a processor (e.g., general purpose processor 106, baseband modem processor 116, controllers/microcontrollers 108, 118, 130, processor cores 200, 201, 202, 203, and processor 250 in FIGS. 1 and 2). Physical components may further include various other processors (xPU) 604*a*, 604*b*, a communication bus 606, a system memory management unit (SMMU) 608, and a display processor 610.

In response to a user interaction with a secure data input device, the communication bus 606 may receive a data input signal from the secure data input device. A secure data input device may include a speaker (e.g., speaker 110 in FIG. 1), a microphone (e.g., microphone 112 in FIG. 1), an antenna (e.g., antenna 120 in FIG. 1), a physical button (e.g., physical button 124 in FIG. 1), a touchscreen (e.g., touchscreen 126 in FIG. 1), or other peripheral devices, such as a camera, an accelerometer, a gyroscope, a biometric sensor, a USB port, etc. (e.g., peripheral devices 128 in FIG. 1). The communication bus 606 may transmit the data input signal to the secure execution environment 602. The transmission of the data input signal between the communication bus 606 and the secure execution environment 602 may be handled by a processor 604*a*.

The secure execution environment 602 may include further components and software-implemented function modules, which may be implemented as software running in the secure execution environment 602 of a processor. These components and software-implemented function modules may include a secure application 626, a secure user interface (UI) service 628, a secure kernel 630, and a data input device driver 632. The data input signal received by the secure execution environment 602 may be interpreted by the data input device driver 632. The data input signal may be converted or translated by the data input device driver 632 from a format in which it is received to a format understood by the other components of the secure execution environment 602.

The converted data input signal may be passed from the data input device driver 632 to the secure user interface service 628, which may be configured to translate the converted data input signal into a user interface interaction. The converted data input signal may be further converted or translated by the secure user interface service 628 from a format representative of data input device sensor signals to a format representative of interactions with a user interface. For example, a tap on a touchscreen may be converted from electrical touch sensor readings to a tap of a secure data input element of a graphical user interface presented on the touchscreen. Similarly, sensor readings from a microphone or camera may be converted to data inputs to a secure data input element of a user interface.

The further converted data input signal may be passed from the secure user interface service 628 to the secure application 626, which may be configured to interpret the further converted data input signal into a data input to the secure application 626. The secure application 626 may be configure to implement in the secure execution environment 602 the digital payment servicer functions of a client application 612 executing in the normal execution environment 600. The secure application 626 may be configure to determine from the further converted data input signal a function of the secure application 626 that the user intended trigger by the data provided to a secure data input element.

In some embodiments, in response to a function call of the client application 612 triggering presentation through the user interface of a vulnerable data input element or a secure data input element, the secure application 626 may implement a function to present a secure data input element via the user interface. In some embodiments, in response to a user input to a secure data input element the secure application 626 may implement a function responsive to the user input, which may trigger a presentation of a secure data input element or other information via the user interface.

The function implemented by the secure application 626 may produce an output of elements to present via the user interface to the secure user interface service 628, which may map the elements to the presentation of the user interface and determine how a user may interact with the elements via the user interface. The mapping and interactions of the elements may be transmitted from the secure user interface service 628 to the secure kernel 630, which may compose a secure user interface display for presentation via a display device, such as a touchscreen or speaker. The secure kernel 630 may also control the transmission of the secure user interface display to the normal execution environment 600 for presentation of the secure user interface display via the display device.

The normal execution environment 600 may include components and software-implemented function modules, which may be implemented as software running in the normal execution environment 600 of a processor. These components and software-implemented function modules may include the client application 612, a secure user interface (UI) listener 614, a secure execution environment communicator 616, a data input device driver 618, a display compositor 620, a display hardware abstraction layer (HAL) 622, and a display device driver 624. The secure execution environment communicator 616 may receive the of the secure user interface display from the secure kernel 630, and transmit the secure user interface display to the secure user interface listener 614.

The secure user interface listener 614 may be configured to recognize receipt of the secure user interface display from the secure execution environment 602. The secure user interface listener 614 may provide the secure user interface display to components of the normal execution environment 600 for presentation of the secure user interface display. In some embodiments, the secure user interface listener 614 may transmit the secure user interface display to a display compositor 620. In some embodiments, the secure user interface listener 614 may interrupt or prevent the presentation of a non-secure display so that the secure user interface display may be presented in combination with the non-secure display, such as a non-secure display of the client application 612.

The display compositor 620 may receive a secure user interface display and non-secure display and combine the secure user interface display and the non-secure display. In some embodiments, the secure user interface display and the non-secure display may be combined as separate secure user interface display and non-secure display portions, such as adjacent to each other or one overlaid over the other. In some embodiments, the secure user interface display and the non-secure display may be combined as an integrated secure user interface and non-secure display. Examples of the combined displays are described further herein with reference to FIGS. 7A-9D. In some embodiments, the display compositor 620 may combine the contents of the secure user interface display and the non-secure display in a display buffer (not shown). The display compositor 620 may transmit the combined display to a display hardware abstraction layer 622.

The display hardware abstraction layer 622 may be configured to translate or convert the combined display from a software useable format to a hardware usable format for the display device. The hardware abstraction layer 622 may transmit the converted combined display to a display device driver 624, which may further communicate the converted combined display to a display processor 610. The display processor 610 may be configured to present the combined display via the display device.

FIGS. 7A-9B illustrate examples representations of combined displays of secure user interface display and the non-secure display. With reference to FIGS. 1-9B, a computing device (e.g., computing device 100 in FIG. 1) having a display device, such as a touchscreen (e.g., touchscreen 126 in FIG. 1) or a speaker (e.g., speaker 110 in FIG. 1), may present a combined display via the display device. In some embodiments, the secure user interface display and the non-secure display may be combined as separate secure user interface display and non-secure display portions, such as adjacent to each other or one overlaid over the other. In some embodiments, the secure user interface display and the non-secure display may be combined as an integrated secure user interface and non-secure display. Each of the following examples may include at least a non-secure display 702 and secure data input elements, such as a text field 706a, 706b, and a button 706c configured for submitting data provided to the text fields 706a, 706b. In some embodiments, the data input elements 706a, 706b, 706c may be presented as part of the non-secure display 702. In some embodiments, the data input elements 706a, 706b, 706c may be presented as part of a secure user interface display 704.

Figure 7B:
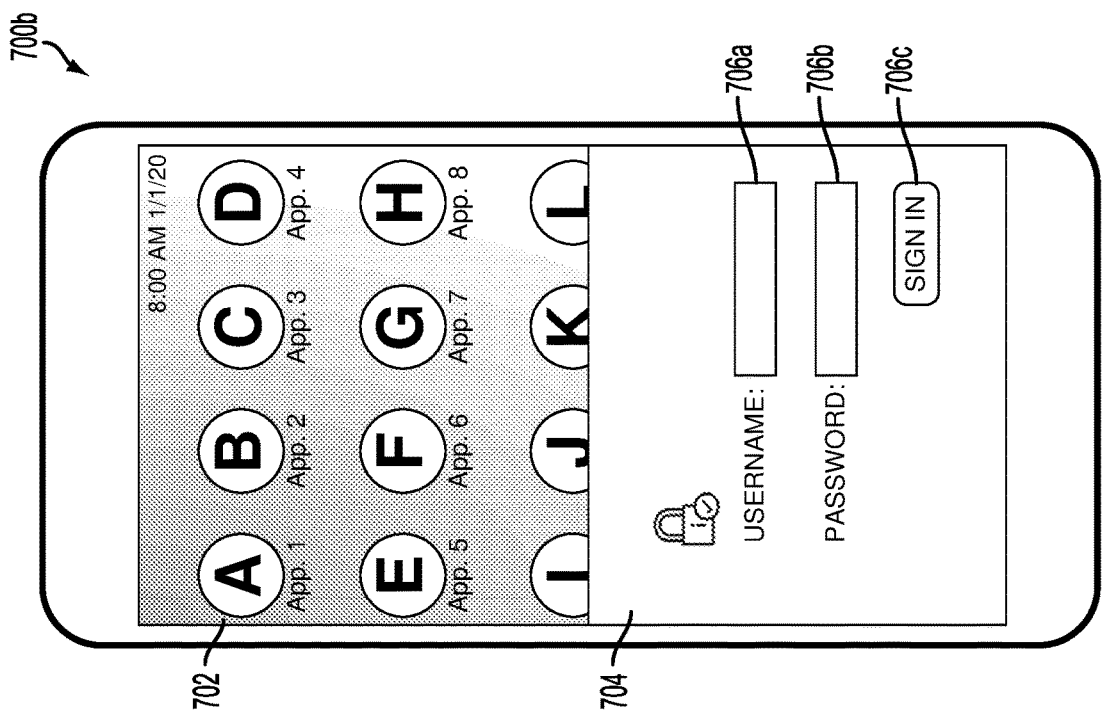
Figure 7A:
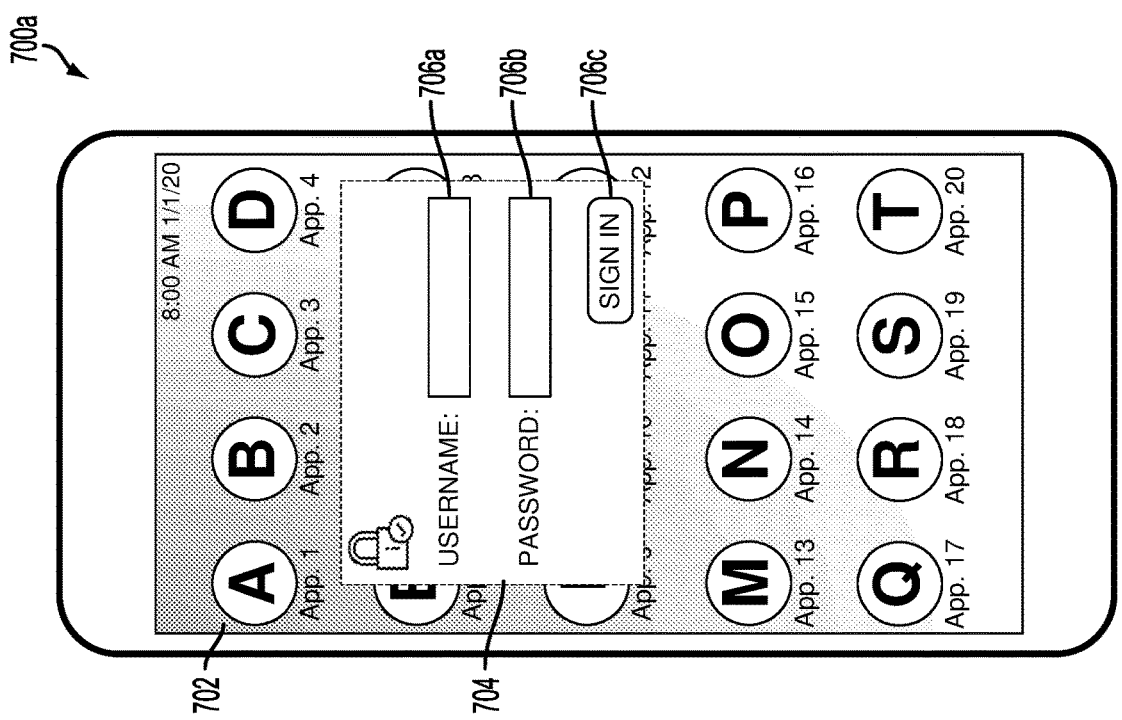

FIGS. 7A-7C illustrate examples of combined displays of secure user interface displays and the non-secure displays of an operating system for implementing various embodiments. FIG. 7A illustrates an example of a combined display 700a having a secure user interface display 704 and a non-secure display 702 of an operating system combined as separate secure user interface display and non-secure display portions one overlaid over the other. The data input elements 706a, 706b, 706c may be presented as part of the secure user interface display 704.

FIGS. 7B and 7C illustrate examples of combined displays 700b, 700c having a secure user interface display 704 and a non-secure display 702 of an operating system combined as separate secure user interface display and non-secure display portions adjacent to each other. The data input elements 706a, 706b, 706c may be presented as part of the secure user interface display 704.

FIGS. 8A-8D illustrate examples of combined displays of secure user interface displays and the non-secure displays of a digital payment servicer application or commercial application for implementing various embodiments.

Figure 8B:
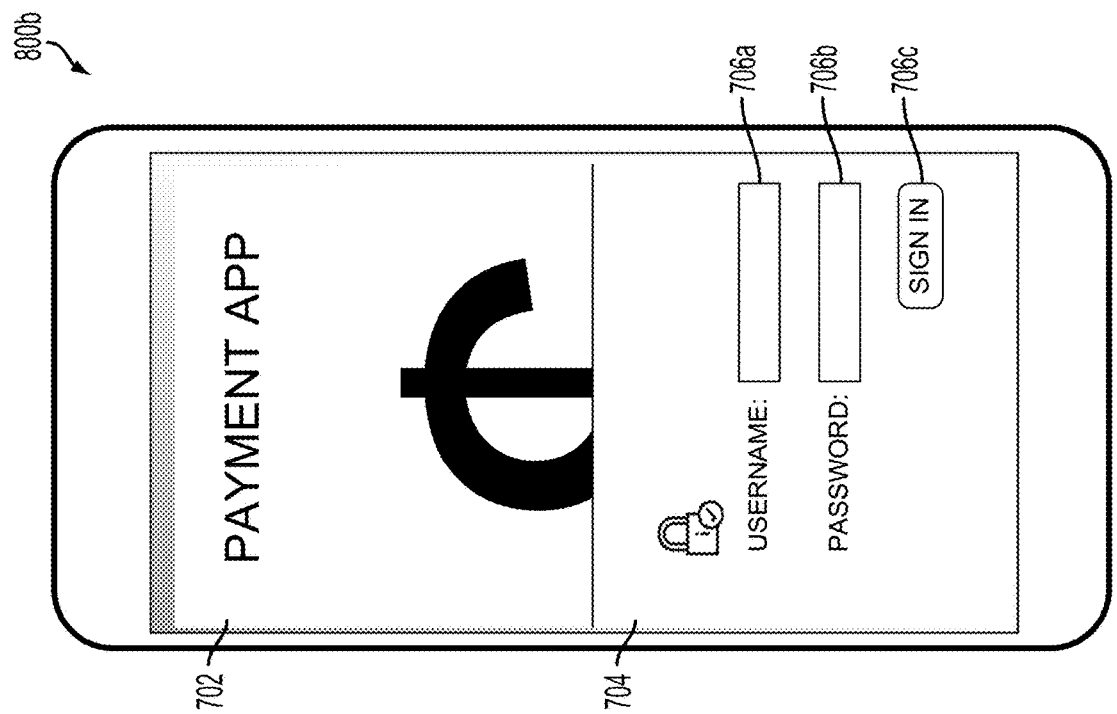
FIGS. 8A-8D are diagrams illustrating examples of a secure user interface implemented with an application screen for implementing various embodiments.
Figure 8A:
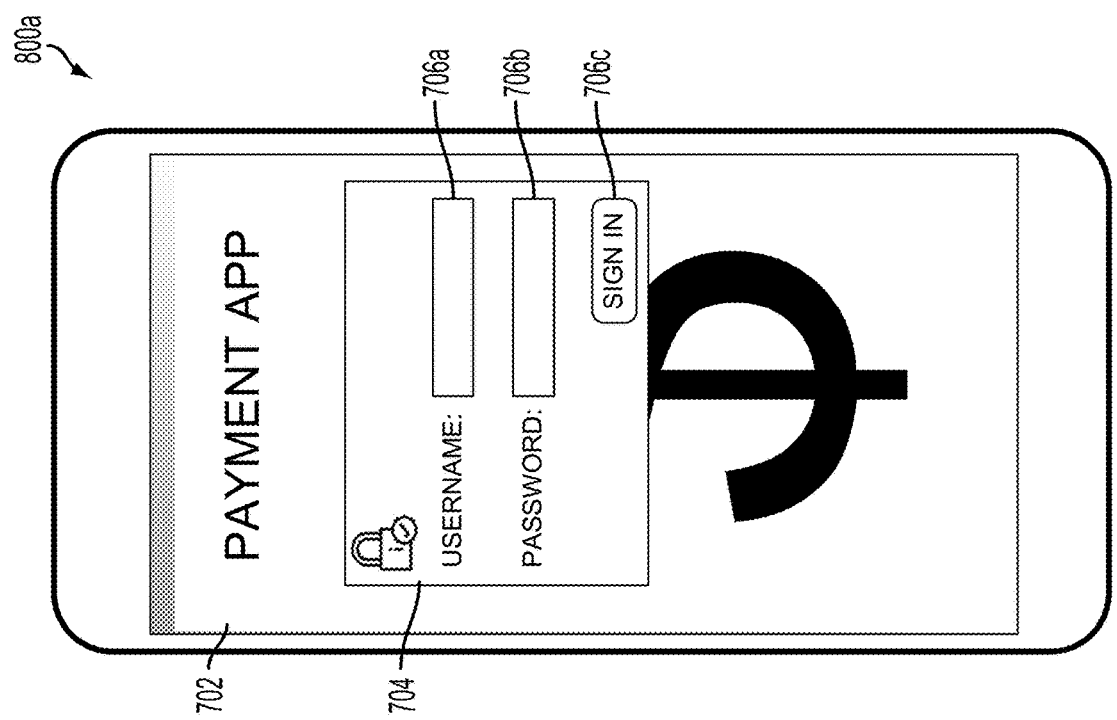

FIG. 8A illustrates an example of a combined display 800a having a secure user interface display 704 and a non-secure display 702 of a digital payment servicer application or commercial application combined as separate secure user interface display and non-secure display portions one overlaid over the other. The data input elements 706a, 706b, 706c may be presented as part of the secure user interface display 704.

Figure 8D:
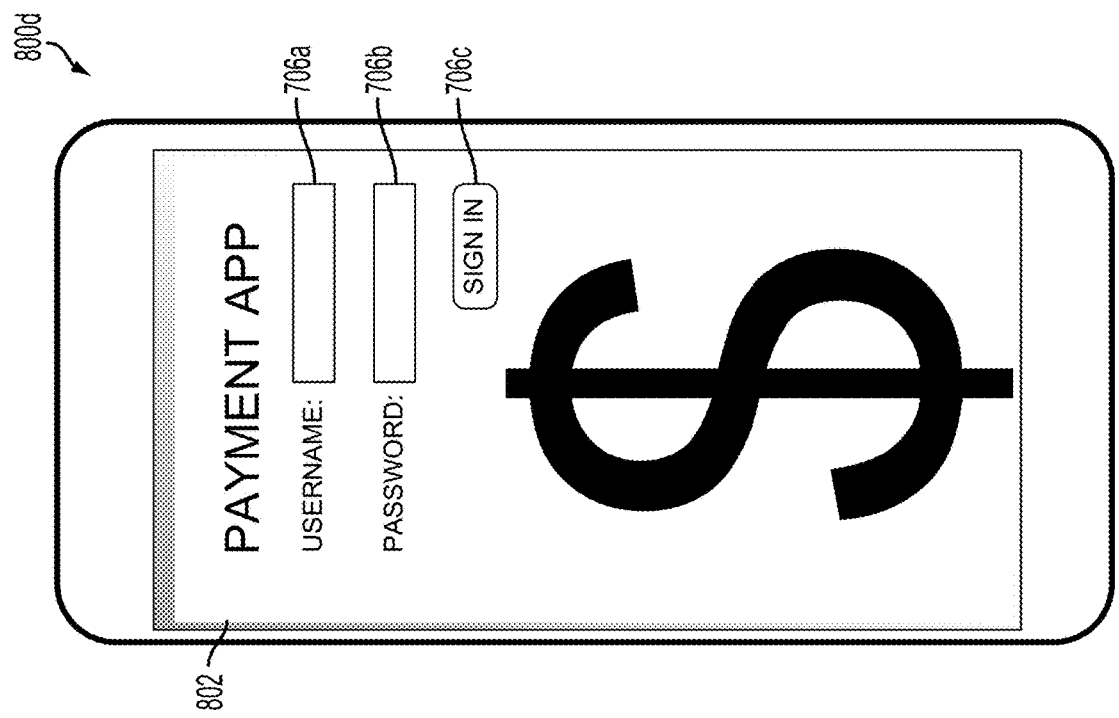
Figure 8C:
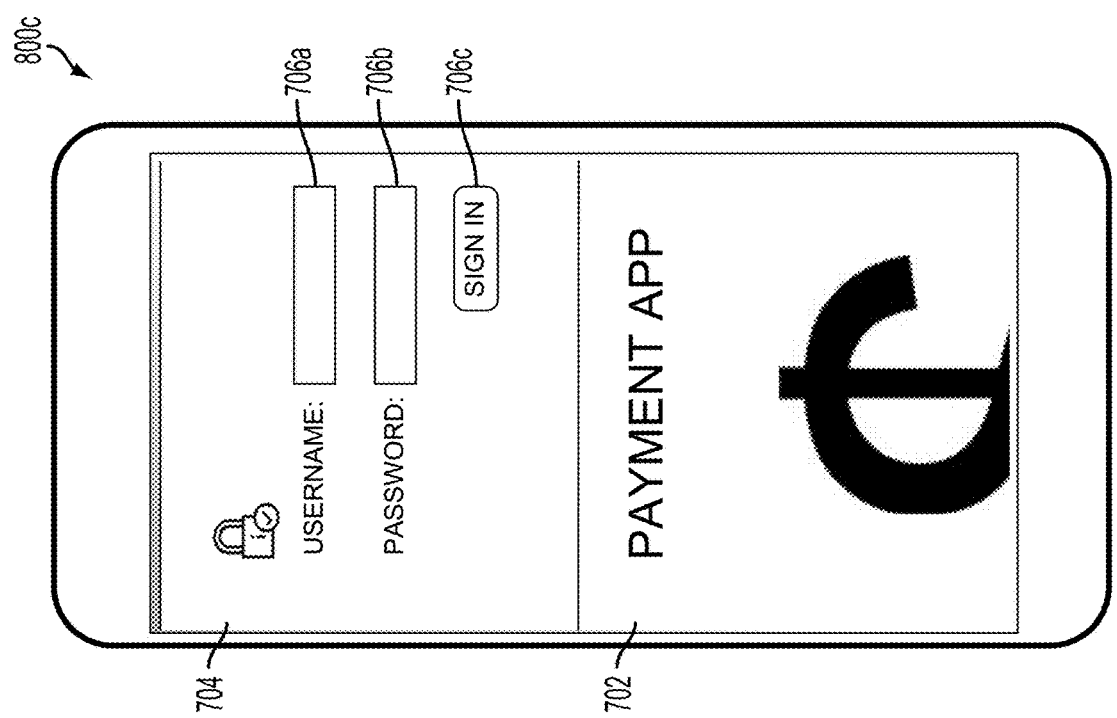

FIGS. 8B and 8C illustrate examples of combined displays 800b, 800c having a secure user interface display 704 and a non-secure display 702 of a digital payment servicer application or commercial application combined as separate secure user interface display and non-secure display portions adjacent to each other. The data input elements 706a, 706b, 706c may be presented as part of the secure user interface display 704.

FIG. 8D illustrates an example 800d of a secure user interface display and the non-secure display combined as an integrated secure user interface and non-secure display 802 of a digital payment servicer application or commercial application. The data input elements 706a, 706b, 706c may be presented as part of the integrated secure user interface and non-secure display 802.

FIGS. 9A-9D illustrate examples of combined displays of secure user interface displays and the non-secure displays of a web browser for implementing various embodiments.

Figure 9B:
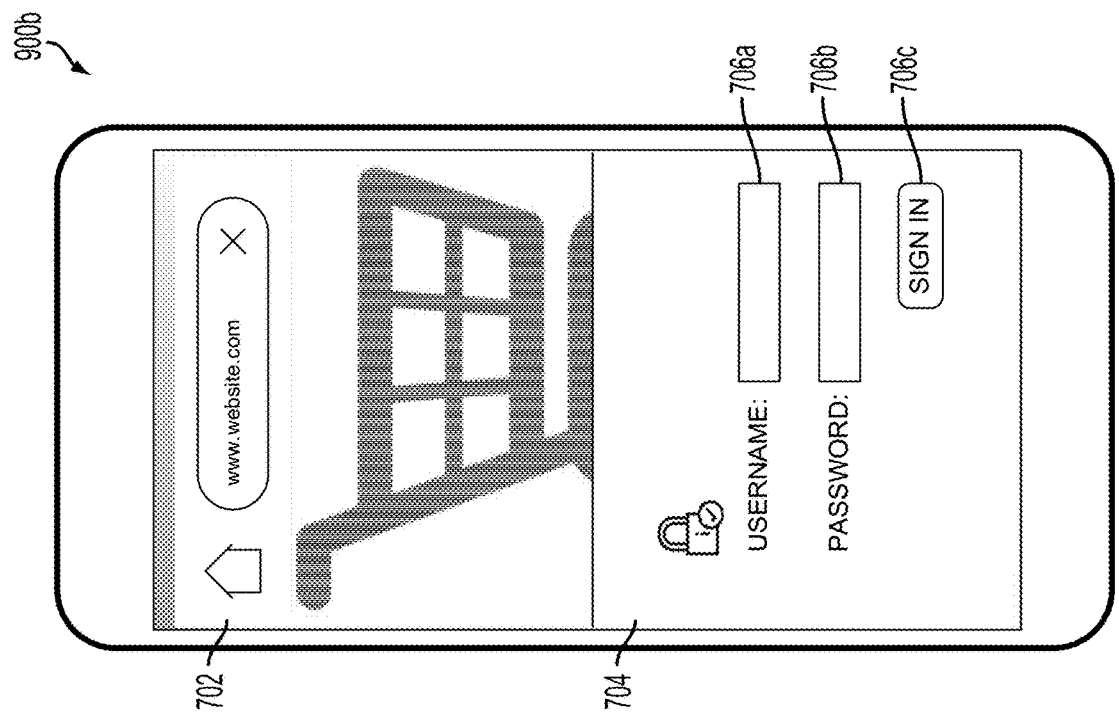
FIGS. 9A-9D are diagrams illustrating examples of a secure user interface implemented with a web browser screen for implementing various embodiments.
Figure 9A:
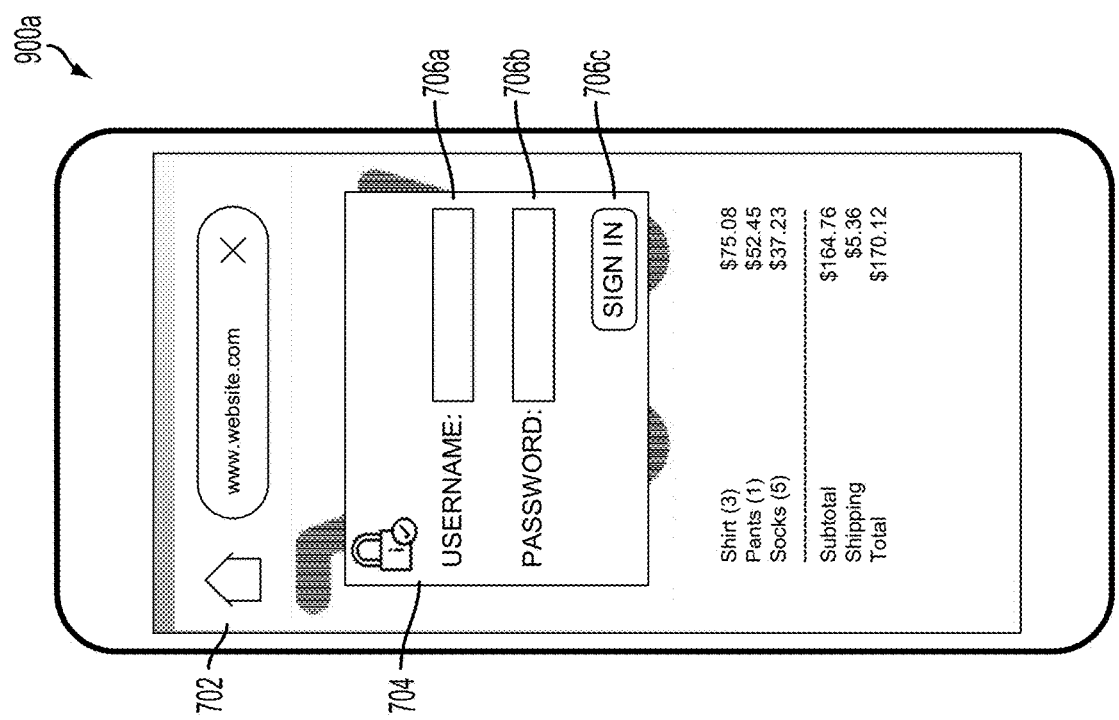

FIG. 9A illustrates an example of a combined display 900a having a secure user interface display 704 and a non-secure display 702 of a web browser combined as separate secure user interface display and non-secure display portions one overlaid over the other. The data input elements 706a, 706b, 706c may be presented as part of the secure user interface display 704.

Figure 9D:
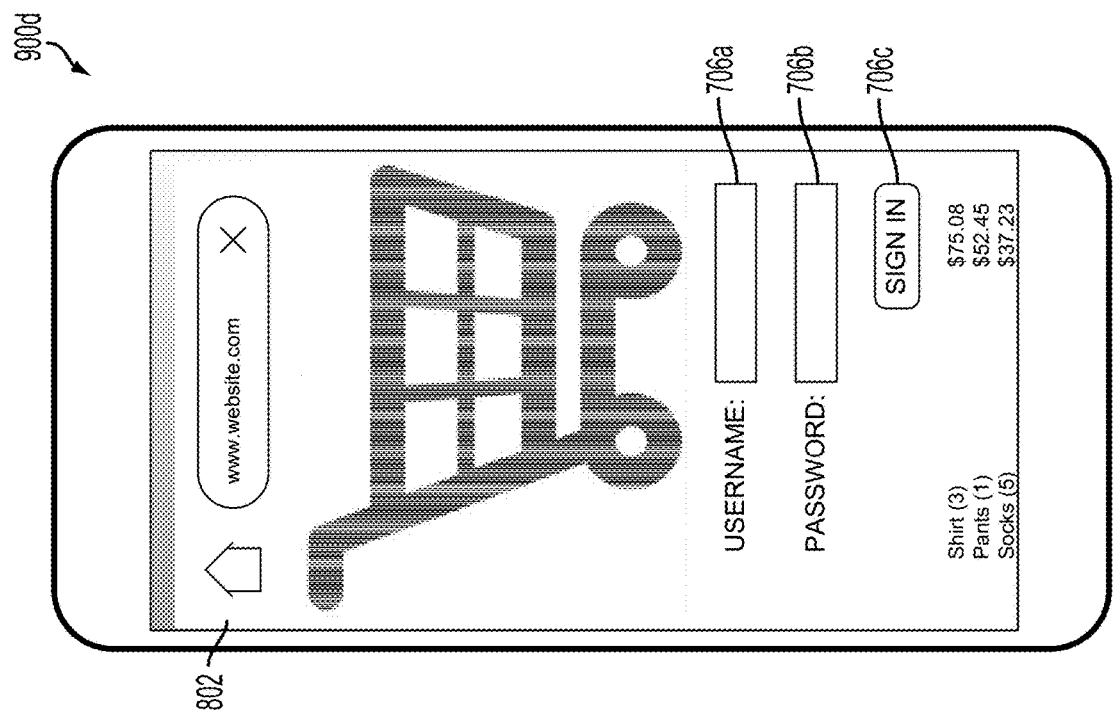
Figure 9C:
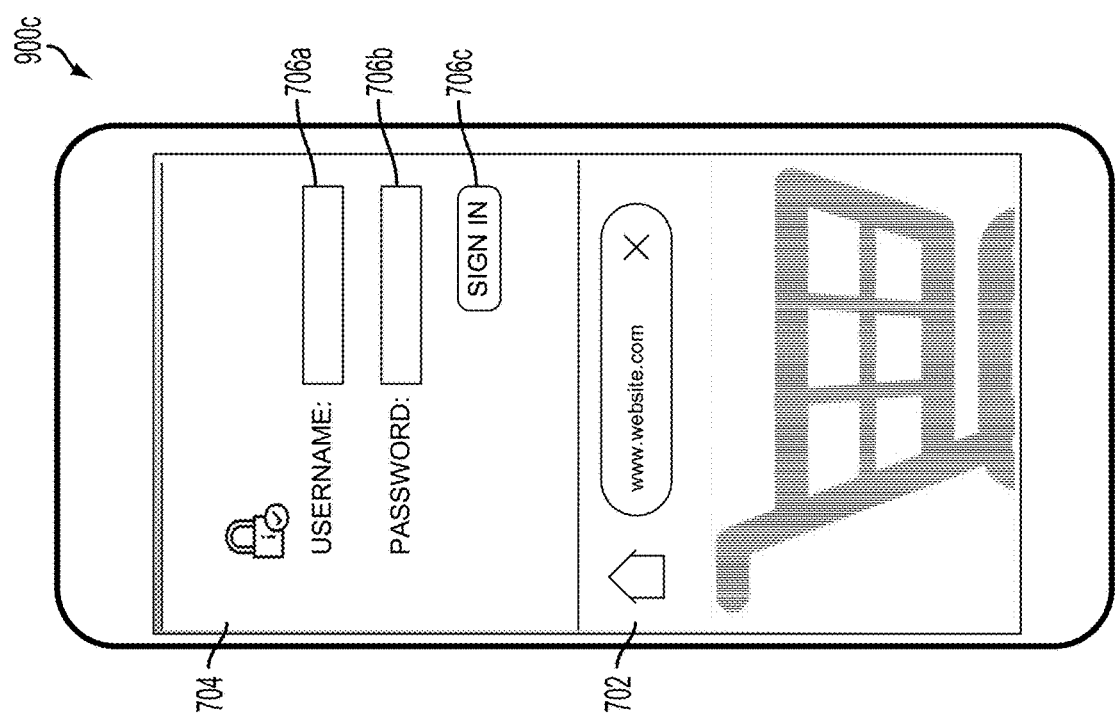

FIGS. 9B and 9C illustrate examples of combined displays 900b, 900c having a secure user interface display 704 and a non-secure display 702 of a web browser combined as separate secure user interface display and non-secure display portions adjacent to each other. The data input elements 706a, 706b, 706c may be presented as part of the secure user interface display 704.

FIG. 9D illustrates an example 900d of a secure user interface display and the non-secure display combined as an integrated secure user interface and non-secure display 802 of a web browser. The data input elements 706a, 706b, 706c may be presented as part of the integrated secure user interface and non-secure display 802.

In some embodiments, the secure user interface display 704 and the integrated secure user interface and non-secure display 802 may be marked with an indicator configured to indicate to the user that the secure user interface display 704 and the integrated secure user interface and non-secure display 802 is secure. In some embodiments, the configuration of the secure user interface display 704 and the non-secure display 702 and/or the non-secure display 802 is provided as an option to the developer or user of an application.

Figure 10:
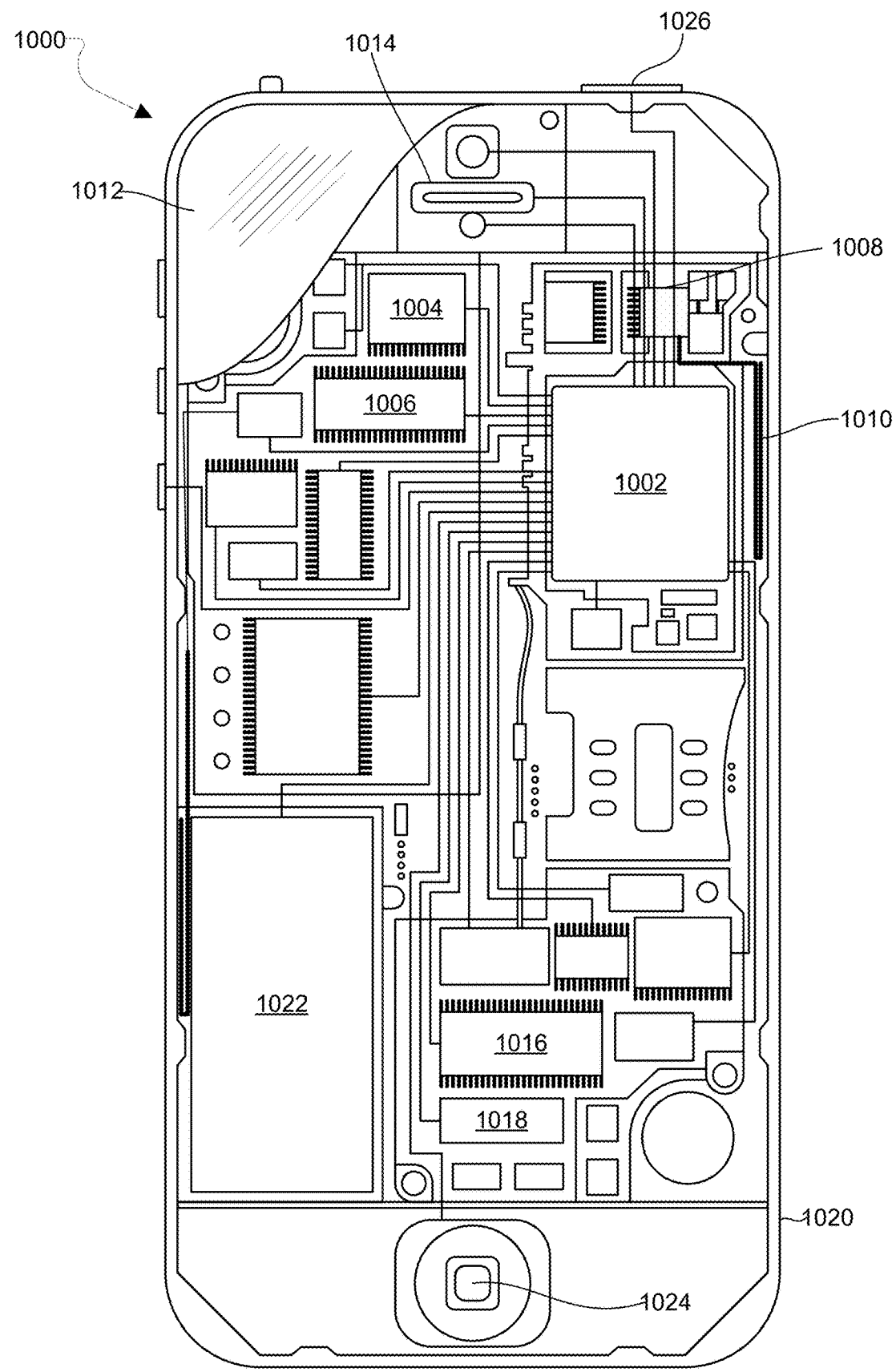
FIG. 10 is a component block diagram illustrating an example wireless communication device suitable for use with the various embodiments.

Various embodiments (including, but not limited to, embodiments described above with reference to FIGS. 1-9D) may be implemented in a wide variety of computing systems including wireless communication devices, an example of which suitable for use with the various embodiments is illustrated in FIG. 10. The wireless communication device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1004 and the processor 1002 may also be coupled to a touchscreen panel 1012, such as a resistive-sensing touchscreen, capacitive-sensing touchscreen, infra-red sensing touchscreen, etc. Additionally, the display of the computing device 1000 need not have touchscreen capability.

The wireless communication device 1000 may have one or more radio signal transceivers 1008 (e.g., Peanut, Bluetooth, ZigBee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The wireless communication device 1000 may include a cellular network wireless modem chip 1016 that enables communication via a cellular network and is coupled to the processor.

The wireless communication device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as USB, FireWire, Thunderbolt, or PCIe. The peripheral device connection interface 1018 may also be coupled to a similarly configured peripheral device connection port (not shown).

The wireless communication device 1000 may also include speakers 1014 for providing audio outputs. The wireless communication device 1000 may also include a housing 1020, constructed of a plastic, metal, or a combination of materials, for containing all or some of the components described herein. The wireless communication device 1000 may include a power source 1022 coupled to the processor 1002, such as a disposable or rechargeable battery. The rechargeable battery may also be coupled to the peripheral device connection port to receive a charging current from a source external to the wireless communication device 1000. The wireless communication device 1000 may also include a physical button 1024 for receiving user inputs. The wireless communication device 1000 may also include a power button 1026 for turning the wireless communication device 1000 on and off.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for implementing a secure user interface display on a computing device, comprising:
   determining, by a secure application running in a secure execution environment of the computing device, that code for generating a data input element of a user interface of a client application running in a normal execution environment of the computing device includes code for generating a vulnerable data input element that allows freeform data entry;
   preventing, by the secure application, execution of the code for generating the vulnerable data input element by the client application in response to determining, by the secure application, that the code for generating the data input element includes the code for generating the vulnerable data input element;
   generating in the secure execution environment by the secure application a secure user interface display portion comprising a secure user interface element that is based on the data input element;
   generating a non-secure display portion by the client application in the normal execution environment of the computing device;
   combining the secure user interface display portion and the non-secure display portion into a combined display; and
   presenting the combined display via a display device.

2. The method of claim 1, further comprising:
   assigning ownership of the data input element to the secure execution environment;
   assigning ownership of a data input device to the secure execution environment; and
   assigning ownership of the display device to the secure execution environment.

3. The method of claim 2, wherein generating in the secure execution environment by the secure application the secure user interface display portion comprising the secure user interface element comprises generating the secure user interface display portion having the data input element owned by the secure execution environment.

4. The method of claim 2, wherein assigning ownership of the data input element to the secure execution environment, assigning ownership of the data input device to the secure execution environment, and assigning ownership of the display device to the secure execution environment are performed in response to determining that the code for generating the data input element includes the code for generating the vulnerable data input element.

5. The method of claim 2, further comprising:
   receiving, in the secure execution environment, a data input signal via the data input device owned by the secure execution environment;
   determining that the data input signal represents a user interaction with the secure user interface element that is based on the data input element owned by the secure execution environment; and
   responding to the data input signal by the secure application in response to determining that the data input signal represents the user interaction with the secure user interface element that is based on the data input element owned by the secure execution environment.

6. The method of claim 2, wherein:
   generating in the secure execution environment by the secure application a secure user interface display portion comprising a secure user interface element that is based on the data input element comprises generating the secure user interface element that is based on the data input element owned by the secure execution environment, wherein the client application running in the normal execution environment includes a digital payment servicer function; and generating the non-secure display portion by the client application in the normal execution environment comprises generating the non-secure display portion for the client application or an operating system.

7. The method of claim 2, further comprising:
receiving, in the secure execution environment, a data input signal via the data input device owned by the secure execution environment;
determining that the data input signal does not represent a user interaction with the secure user interface element that is based on the data input element owned by the secure execution environment; and
providing the data input signal to the client application running in the normal execution environment in response to determining that the data input signal does not represent the user interaction with the secure user interface element that is based on the data input element owned by the secure execution environment.

8. The method of claim 1, wherein presenting the combined display via the display device comprises one of:
presenting the secure user interface display portion and the non-secure display portion adjacent to each other;
presenting the secure user interface display portion overlaid over the non-secure display portion; or
presenting an integrated secure user interface display portion and non-secure display portion.

9. A computing device, comprising:
a display device; and
a processor coupled to the display device and configured to execute instructions within a secure execution environment and a normal execution environment, wherein the processor is configured to execute processor-executable instructions to perform operations comprising:
determining, by a secure application running in a secure execution environment of the computing device, that code for generating a data input element of a user interface of a client application running in the normal execution environment includes code for generating a vulnerable data input element that allows freeform data entry;
preventing, by the secure application, execution of the code for generating the vulnerable data input element by the client application in response to determining, by the secure application, that the code for generating the data input element includes the code for generating the vulnerable data input element;
generating in the secure execution environment by the secure application a secure user interface display portion comprising a secure user interface element that is based on the data input element;
generating a non-secure display portion by the client application in the normal execution environment;
combining the secure user interface display portion and the non-secure display portion into a combined display; and
presenting the combined display on the display device.

10. The computing device of claim 9, further comprising a data input device coupled to the processor, wherein the processor is further configured with processor-executable instructions to perform operations further comprising:

assigning ownership of the data input element to the secure execution environment;
assigning ownership of the data input device to the secure execution environment; and
assigning ownership of the display device to the secure execution environment.

11. The computing device of claim 10, wherein the processor is further configured with processor-executable instructions such that generating in the secure execution environment by the secure application the secure user interface display portion comprising the secure user interface element comprises generating the secure user interface display portion having the data input element owned by the secure execution environment.

12. The computing device of claim 10, wherein the processor is further configured with processor-executable instructions such that assigning ownership of the data input element to the secure execution environment, assigning ownership of the data input device to the secure execution environment, and assigning ownership of the display device to the secure execution environment are performed in response to determining that the code for generating the data input element includes the code for generating the vulnerable data input element.

13. The computing device of claim 10, wherein the processor is further configured with processor-executable instructions to perform operations further comprising:
receiving, in the secure execution environment, a data input signal via the data input device owned by the secure execution environment;
determining that the data input signal represents a user interaction with the secure user interface element that is based on the data input element owned by the secure execution environment; and
responding to the data input signal by the secure application in response to determining that the data input signal represents the user interaction with the secure user interface element that is based on the data input element owned by the secure execution environment.

14. The computing device of claim 10, wherein the processor is further configured with processor-executable instructions to perform operations such that:
generating in the secure execution environment by the secure application a secure user interface display portion comprising a secure user interface element that is based on the data input element comprises generating the secure user interface element that is based on the data input element owned by the secure execution environment, wherein the client application running in the normal execution environment includes a digital payment servicer function; and
generating the non-secure display portion by the client application in the normal execution environment comprises generating the non-secure display portion for the client application or an operating system.

15. The computing device of claim 10, wherein the processor is further configured with processor-executable instructions to perform operations further comprising:
receiving, in the secure execution environment, a data input signal via the data input device owned by the secure execution environment;
determining that the data input signal does not represent a user interaction with the secure user interface element that is based on the data input element owned by the secure execution environment; and
providing the data input signal to the client application running in the normal execution environment in response to determining that the data input signal does not represent the user interaction with the secure user interface element that is based on the data input element owned by the secure execution environment.

16. The computing device of claim 9, wherein the processor is further configured with processor-executable instructions such that presenting the combined display via the display device comprises one of:
presenting the secure user interface display portion and the non-secure display portion adjacent to each other;
presenting the secure user interface display portion overlaid over the non-secure display portion; or
presenting an integrated secure user interface display portion and non-secure display portion.

17. A non-transitory processor-readable storage medium having stored thereon processor-executable instructions configured to cause a processor of a computing device to perform operations comprising:
determining, by a secure application running in a secure execution environment of the computing device, that code for generating a data input element of a user interface of a client application running in the normal execution environment includes code for generating a vulnerable data input element that allows freeform data entry;
preventing, by the secure application, execution of the code for generating the vulnerable data input element by the client application in response to determining, by the secure application, that the code for generating the data input element includes the code for generating the vulnerable data input element;
generating in the secure execution environment by the secure application a secure user interface display portion comprising a secure user interface element that is based on the data input element;
generating a non-secure display portion by the client application in the normal execution environment;
combining the secure user interface display portion and the non-secure display portion into a combined display; and
presenting the combined display on a display device.

18. The non-transitory processor-readable storage medium of claim 17, wherein the stored processor-executable instructions are configured to cause a processor of a computing device to perform operations further comprising:
assigning ownership of the data input element to the secure execution environment;
assigning ownership of a data input device to the secure execution environment; and
assigning ownership of the display device to the secure execution environment.

19. The non-transitory processor-readable storage medium of claim 18, wherein the stored processor-executable instructions are configured to cause a processor of a computing device to perform operations such that generating in the secure execution environment by the secure application the secure user interface display portion comprising the secure user interface element comprises generating the secure user interface display portion having the data input element owned by the secure execution environment.

20. The non-transitory processor-readable storage medium of claim 18, wherein the stored processor-executable instructions are configured to cause a processor of a computing device to perform operations such that assigning ownership of the data input element to the secure execution environment, assigning ownership of the data input device to the secure execution environment, and assigning ownership of the display device to the secure execution environment are performed in response to determining that the code for generating the data input element includes the code for generating the vulnerable data input element.

21. The non-transitory processor-readable storage medium of claim 18, wherein the stored processor-executable instructions are configured to cause a processor of a computing device to perform operations further comprising:
receiving, in the secure execution environment, a data input signal via the data input device owned by the secure execution environment;
determining that the data input signal represents a user interaction with the secure user interface element that is based on the data input element owned by the secure execution environment; and
responding to the data input signal by the secure application in response to determining that the data input signal represents the user interaction with the secure user interface element that is based on the data input element owned by the secure execution environment.

22. The non-transitory processor-readable storage medium of claim 18, wherein the stored processor-executable instructions are configured to cause a processor of a computing device to perform operations such that:
generating in the secure execution environment comprises generating the secure user interface element that is based on the data input element owned by the secure execution environment, wherein the client application running in the normal execution environment includes a digital payment servicer function; and
generating the non-secure display portion by the client application in the normal execution environment comprises generating the non-secure display portion for the client application or an operating system.

23. The non-transitory processor-readable storage medium of claim 18, wherein the stored processor-executable instructions are configured to cause a processor of a computing device to perform operations further comprising:
receiving, in the secure execution environment, a data input signal via the data input device owned by the secure execution environment;
determining that the data input signal does not represent a user interaction with the secure user interface element that is based on the data input element owned by the secure execution environment; and
providing the data input signal to the client application running in the normal execution environment in response to determining that the data input signal does not represent the user interaction with the secure user interface element that is based on the data input element owned by the secure execution environment.

24. The non-transitory processor-readable storage medium of claim 17, wherein the stored processor-executable instructions are configured to cause a processor of a computing device to perform operations such that presenting the combined display via the display device comprises one of:
presenting the secure user interface display portion and the non-secure display portion adjacent to each other;
presenting the secure user interface display portion overlaid over the non-secure display portion; or
presenting an integrated secure user interface display portion and non-secure display portion.

25. A computing device, comprising:
a display device;
means for determining, by a secure application running in a secure execution environment of the computing device, that code for generating a data input element of a user interface of a client application running in the normal execution environment includes code for generating a vulnerable data input element that allows freeform data entry;

means for preventing, by the secure application, execution of the code for generating the vulnerable data input element by the client application in response to determining, by the secure application, that the code for generating the data input element includes the code for generating the vulnerable data input element;

means for generating in the secure execution environment by the secure application a secure user interface display portion comprising a secure user interface element that is based on the data input element;

means for generating a non-secure display portion by the client application in the normal execution environment of the computing device;

means for combining the secure user interface display portion and the non-secure display portion into a combined display; and means for presenting the combined display on the display device.

26. The computing device of claim 25, further comprising:

a data input device;

means for assigning ownership of the data input element to the secure execution environment;

means for assigning ownership of the data input device to the secure execution environment; and means for assigning ownership of the display device to the secure execution environment, wherein means for generating the secure user interface display portion in the secure execution environment comprises means for generating the secure user interface display portion having the data input element owned by the secure execution environment.

27. The computing device of claim 26, further comprising:

means for receiving, in the secure execution environment, a data input signal via the data input device owned by the secure execution environment;

means for determining that the data input signal represents a user interaction with the secure user interface element that is based on the data input element owned by the secure execution environment; and means for responding to the data input signal by the secure application in response to determining that the data input signal represents the user interaction with the secure user interface element that is based on the data input element owned by the secure execution environment.

28. The computing device of claim 26, wherein:

means for generating in the secure execution environment by the secure application a secure user interface display portion comprising a secure user interface element that is based on the data input element comprises means for generating the secure user interface element that is based on the data input element owned by the secure execution environment, wherein the client application running in the normal execution environment includes a digital payment servicer function; and means for generating the non-secure display portion by the client application in the normal execution environment comprises means for generating the non-secure display portion for the client application or an operating system.

29. The computing device of claim 26, further comprising:

means for receiving, in the secure execution environment, a data input signal via the data input device owned by the secure execution environment;

means for determining that the data input signal does not represent a user interaction with the secure user interface element that is based on the data input element owned by the secure execution environment; and means for providing the data input signal to the client application running in the normal execution environment in response to determining that the data input signal does not represent the user interaction with the secure user interface element that is based on the data input element owned by the secure execution environment.

30. The computing device of claim 25, wherein means for presenting the combined display via the display device comprises one of:

means for presenting the secure user interface display portion and the non-secure display portion adjacent to each other;

means for presenting the secure user interface display portion overlaid over the non-secure display portion; or means for presenting an integrated secure user interface display portion and non-secure display portion.

* * * * *